US011278031B2

(12) United States Patent
Jones et al.

(10) Patent No.: US 11,278,031 B2
(45) Date of Patent: Mar. 22, 2022

(54) LOW PRESSURE STUNNER

(71) Applicant: Jarvis Products Corporation, Middletown, CT (US)

(72) Inventors: Arthur Jones, Tabor, IA (US); Trent Jones, Tabor, IA (US)

(73) Assignee: Jarvis Products Corporation, Middletown, CT (US)

( * ) Notice: Subject to any disclaimer, the term of this patent is extended or adjusted under 35 U.S.C. 154(b) by 0 days.

(21) Appl. No.: 17/123,748

(22) Filed: Dec. 16, 2020

(65) Prior Publication Data

US 2021/0321632 A1 Oct. 21, 2021

Related U.S. Application Data

(60) Provisional application No. 63/010,314, filed on Apr. 15, 2020.

(51) Int. Cl.
*A22B 3/00* (2006.01)
*A22B 3/02* (2006.01)

(52) U.S. Cl.
CPC ..................... *A22B 3/02* (2013.01)

(58) Field of Classification Search
CPC .................... A22B 3/00; A22B 3/02
USPC ............................. 452/52, 57, 62
See application file for complete search history.

(56) References Cited

U.S. PATENT DOCUMENTS

| 4,503,585 | A | * | 3/1985 | Hamel | A22B 3/02 227/130 |
| 4,531,322 | A | * | 7/1985 | Termet | A22B 3/02 42/1.12 |
| 6,135,871 | A | | 10/2000 | Jones | |
| 6,769,976 | B2 | * | 8/2004 | Bass | A22B 3/083 452/62 |
| 8,821,221 | B1 | | 9/2014 | Bock | |
| 9,044,028 | B2 | * | 6/2015 | Evans | A22B 3/02 |
| 10,258,051 | B2 | | 4/2019 | Jones et al. | |
| 10,299,486 | B2 | | 5/2019 | Jones et al. | |
| 10,375,969 | B1 | | 8/2019 | Jones et al. | |
| 2004/0209562 | A1 | | 10/2004 | Jones | |

* cited by examiner

*Primary Examiner* — Richard T Price, Jr.
(74) *Attorney, Agent, or Firm* — DeLio Peterson & Curcio LLC; Todd A. Bayne, Jr.; Peter W. Peterson

(57) ABSTRACT

A reduced pressure pneumatic animal stunner with a low-complexity valve and venting system, and method of use thereof, is disclosed. The stunner includes a hollow housing, a stunning rod chamber, a head contact movable within an outer housing nose, a stunning rod, and a catch system employing at least one arcuate catch, a catch retainer, and a catch piston slideable within an opening of a catch cylinder. The catch piston has passageways disposed therein to allow for flow of a pressurized fluid therethrough. One passageway allows fluid to flow to a rearward end of the stunning rod chamber, and another allows fluid to flow to a forward end of the stunning rod chamber. Pressurized fluid may flow from a source through an internal passageway to the front of the stunning rod chamber alongside at least one resilient cushion designed to cushion stop the forward movement of the stunning rod.

40 Claims, 17 Drawing Sheets

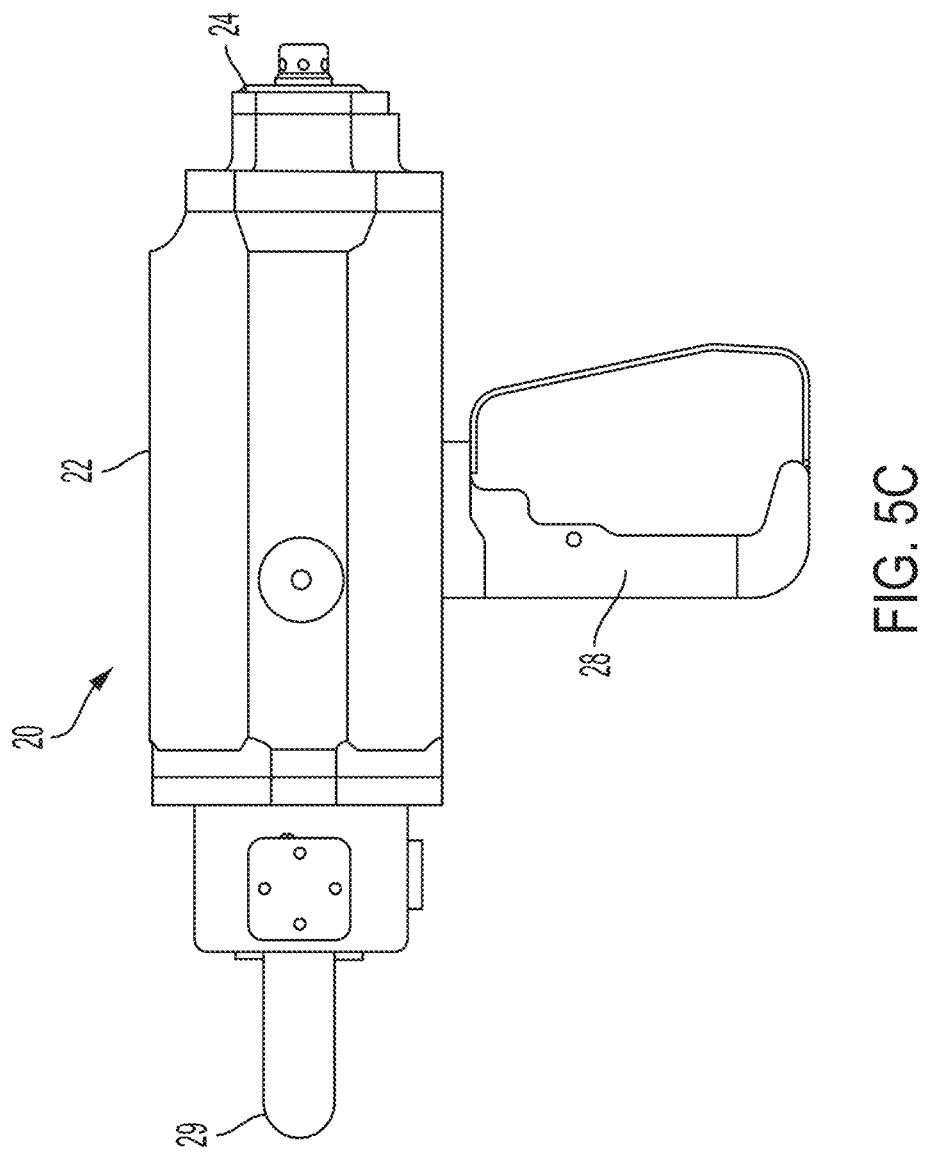

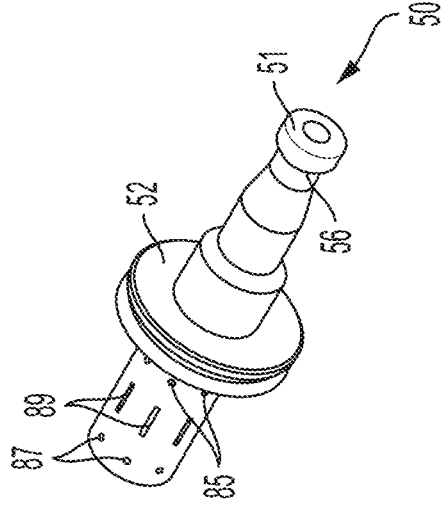
FIG. 7A
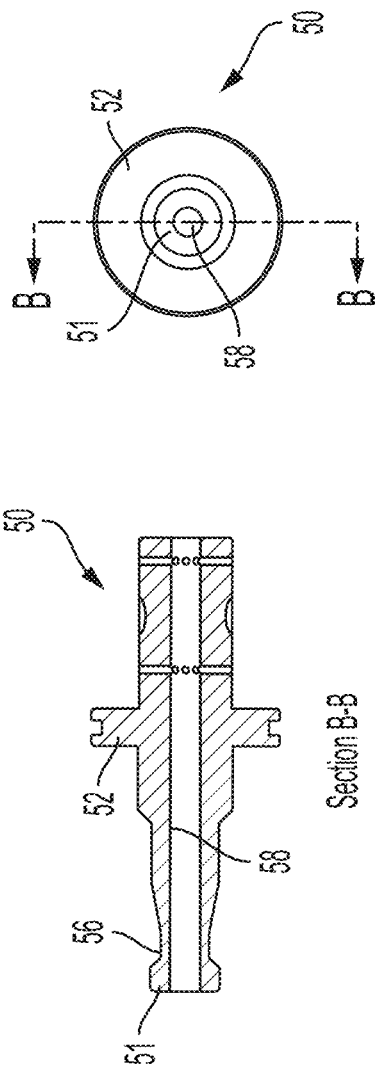
FIG. 7B
FIG. 7C

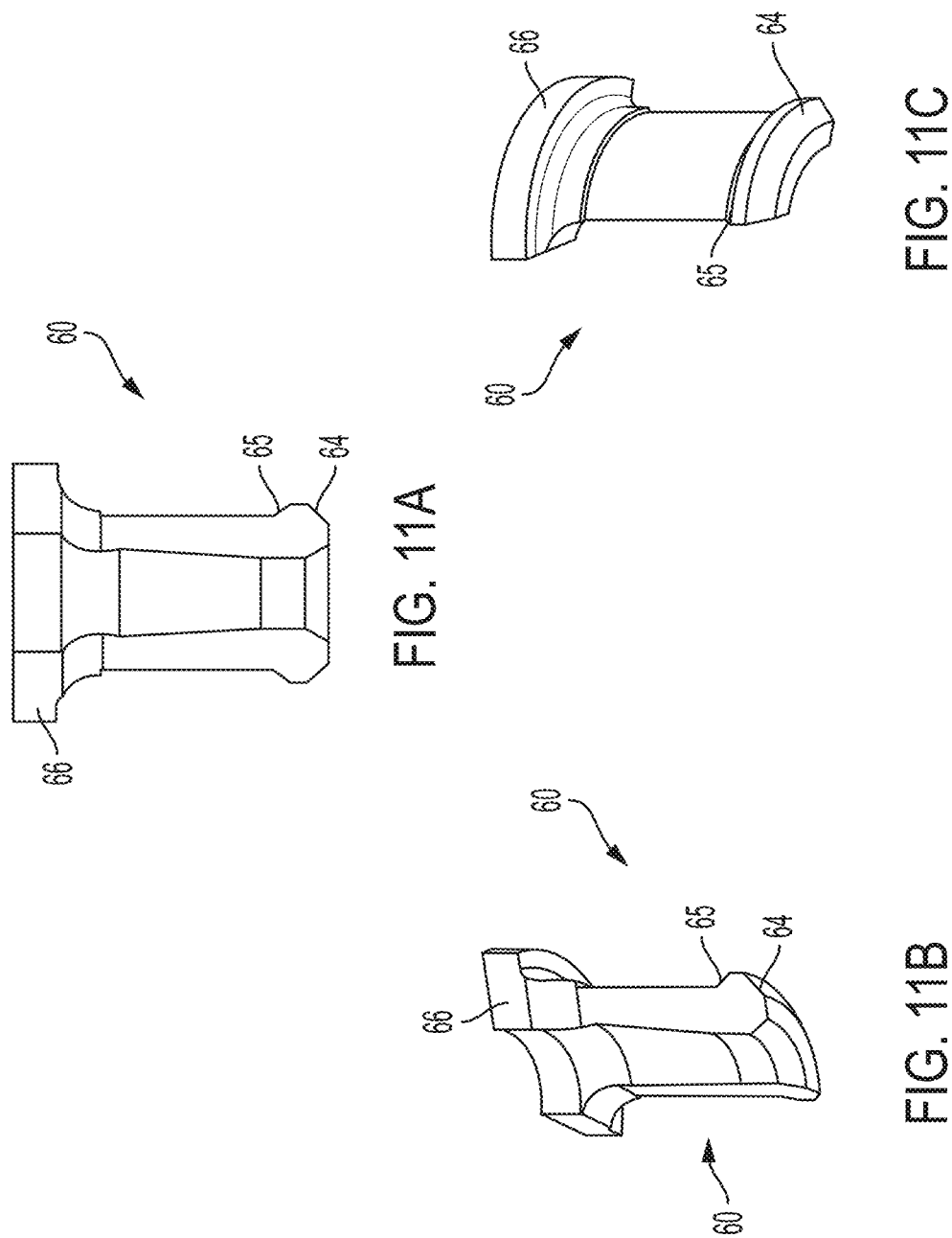

LOW PRESSURE STUNNER

BACKGROUND OF THE INVENTION

1. Field of the Invention

This invention relates in general to a pneumatic animal stunner used in livestock/slaughterhouse operations.

2. Description of Related Art

In livestock production plants, it is important to stun and disable an animal for processing. In livestock production farms, it is important to euthanize animals suffering from severe injury or irreversible disease so as to prevent the spread of illness. Although numerous methods have been used to stun and euthanize livestock, captive bolt mechanisms have proven to be the most efficient, inexpensive, and humane way to disable the animal. Particularly, pneumatic captive bolt devices have been used in this capacity.

Pneumatic stunners that provide for automatic retraction of the stunning rod typically have complex valve systems that are more difficult to manufacture and tend to add to the cost of the stunner. Such valve systems also tend to add weight to the device, which may increase operator fatigue. Additional issues involve the requirement of supplying the pressurized fluid at relatively high pressures, typically in the range of 175-220 psi (1.3-1.6 MPa). Portable stunners are generally lighter in weight, but after firing often require manual retraction of the stunning rod, also adding to operator fatigue.

SUMMARY OF THE INVENTION

Bearing in mind the problems and deficiencies of the prior art, it is therefore an object of the present invention to provide a pneumatic animal stunner and method of use that has reduced complexity in valve and venting systems and reduced cost to manufacture.

It is another object of the present invention to provide a pneumatic animal stunner that has reduced weight and reduced operator fatigue.

It is a further object of the present invention to provide a pneumatic animal stunner that may use reduced pressure of the pressurized fluid needed for operation, and has rugged construction to avoid accidental firing and damage.

Still other objects and advantages of the invention will in part be obvious and will in part be apparent from the specification.

The above and other objects, which will be apparent to those skilled in the art, are achieved in the present invention which is directed to a pneumatic animal stunner. A housing has a catch piston chamber, a stunning rod chamber and a front end forward of the stunning rod chamber. A supply passageway is disposed in the housing between a source of pressurized fluid and the catch piston chamber. A stunning rod is slideable within the stunning rod chamber and capable of being driven forward along a longitudinal axis towards and out of the front end of the housing. A catch is mounted within the housing for alternately holding and releasing the stunning rod. A catch piston is disposed adjacent the catch and is in sliding contact within the catch piston chamber, the catch piston being adapted to move between a first position urging the catch to hold and prevent the stunning rod from being driven forward, and a second position permitting the catch to release and permit the stunning rod to be driven forward. A first passageway in the catch piston is in alignment with the housing supply passageway when the catch piston is in the first position permitting air to flow from the source of pressurized fluid through the first passageway to a rearward end of the stunning rod chamber. A second passageway in the catch piston is in alignment with the supply passageway when the catch piston is in the second position permitting air to flow from the source of pressurized fluid through the second passageway to a forward end of the stunning rod chamber. When the catch piston is in the first position, pressurized fluid may flow from the source through the supply passageway and the first passageway into the rearward end of the stunning rod chamber to drive the stunning rod forward upon release of the catch. When the catch piston is in the second position after releasing the catch, pressurized fluid may flow from the source through the supply passageway and the second passageway into the forward end of the stunning rod chamber to drive the stunning rod rearward.

The catch piston may be in the second position after release of the catch, and pressurized fluid may flow from the source through the supply passageway and the second passageway into the forward end of the stunning rod chamber to drive the stunning rod rearward and cause the catch piston to move again to the first position, which may urge the catch to hold and prevent the stunning rod from being driven forward. A stunning rod piston may further be included, which is connected to the stunning rod and slideable within the stunning rod chamber. A pair of cushions at a front of the stunning rod chamber to stop the stunning rod and stunning rod piston when the stunning rod piston reaches the front of the stunning rod chamber may be provided.

The pneumatic animal stunner may still further include an internal passageway in the housing, which extends from the catch piston chamber to the front of the stunning rod chamber between the pair of cushions. When the catch piston is in the second position, pressurized fluid may flow from the source through the second passageway in the catch piston and the internal passageway into the forward end of the stunning rod chamber between the pair of cushions to drive the stunning rod rearward.

In another embodiment, the pneumatic animal stunner may further include an on/off main valve in the housing to control the flow of pressurized fluid from the source to the supply passageway. The catch piston may include a central passageway, wherein the first passageway extends from the central passageway to the supply passageway when the catch piston is in the first position to supply pressurized fluid through the central passageway to the rearward end of the stunning rod chamber. The catch piston second passageway may comprise a slot in an outer wall of the catch piston in alignment with the supply passageway when the catch piston is in the second position permitting pressurized fluid to flow from the source through the supply passageway and the slot to a forward end of the stunning rod chamber.

The pneumatic animal stunner may further include an internal passageway in the housing that extends from the catch piston chamber to the front of the stunning rod chamber, wherein the catch piston second passageway comprises a slot in an outer wall of the catch piston in alignment with the supply passageway and the internal passageway when the catch piston is in the second position to permit pressurized fluid to flow from the source through the supply passageway, the slot in the catch piston and the internal passageway into the forward end of the stunning rod chamber to drive the stunning rod rearward. The pneumatic animal stunner may further include a third passageway in the catch piston that permits air to flow from the rearward end of the stunning rod chamber through the catch piston central passageway and to the atmosphere while the stunning rod is being driven rearward.

The present invention is also directed to a method of stunning an animal. The method provides: a housing having a catch piston chamber, a stunning rod chamber and a front end forward of the stunning rod chamber; a supply passageway in the housing between a source of pressurized fluid and the catch piston chamber; a stunning rod slideable within the stunning rod chamber capable of being driven forward along a longitudinal axis towards and out of the front end of the housing; a catch mounted within the housing for alternately holding and releasing the stunning rod; a catch piston disposed adjacent the catch and in sliding contact within the catch piston chamber, the catch piston being adapted to move between a first position urging the catch to hold and prevent the stunning rod from being driven forward, and a second position permitting the catch to release and permit the stunning rod to be driven forward; a first passageway in the catch piston in alignment with the housing supply passageway when the catch piston is in the first position permitting air to flow from the source of pressurized fluid through the first passageway to a rearward end of the stunning rod chamber; and a second passageway in the catch piston in alignment with the supply passageway when the catch piston is in the second position permitting air to flow from the source of pressurized fluid through the second passageway to a forward end of the stunning rod chamber. The method includes the steps of: moving the catch piston into the first position urging the catch to hold and prevent the stunning rod from being driven forward, moving the catch piston towards the second position to release the catch, causing pressurized fluid to flow from the source through the first passageway into the rearward end of the stunning rod chamber to drive the stunning rod forward upon release of the catch to stun the animal, and, upon movement of the catch piston into the second position, flowing pressurized fluid from the source through the second passageway into the forward end of the stunning rod chamber to drive the stunning rod rearward.

In an embodiment of the method, the catch piston is in the second position after releasing the catch. Pressurized fluid may flow from the source through the second passageway into the forward end of the stunning rod chamber to drive the stunning rod rearward and cause the catch piston to move again to the first position urging the catch to hold and prevent the stunning rod from being driven forward.

The method may further provide: a stunning rod piston connected to the stunning rod and slideable within the stunning rod chamber; a pair of cushions at a front of the stunning rod chamber to stop the stunning rod and stunning rod piston when the stunning rod piston reaches the front of the stunning rod chamber; and an internal passageway in the housing extending from the catch piston chamber to the front of the stunning rod chamber between the pair of cushions. Upon movement of the catch piston to the second position, pressurized fluid may flow from the source through the second passageway in the catch piston and the internal passageway into the forward end of the stunning rod chamber between the pair of cushions to drive the stunning rod rearward.

In still another embodiment, the method may further provide: a central passageway in the catch piston, wherein the first passageway extends from the central passageway to the supply passageway when the catch piston is in the first position to supply pressurized fluid through the central passageway to the rearward end of the stunning rod chamber. The catch piston second passageway may comprise a slot in an outer wall of the catch piston in alignment with the supply passageway when the catch piston is in the second position permitting pressurized fluid to flow from the source through the supply passageway and the slot to a forward end of the stunning rod chamber. The method may further provide an internal passageway in the housing extending from the catch piston chamber to the front of the stunning rod chamber, wherein the catch piston second passageway comprises a slot in an outer wall of the catch piston in alignment with the supply passageway and the internal passageway when the catch piston is in the second position to permit pressurized fluid to flow from the source through the supply passageway, the slot in the catch piston and the internal passageway into the forward end of the stunning rod chamber to drive the stunning rod rearward.

The method may further provide a third passageway in the catch piston permitting air to flow from the rearward end of the stunning rod chamber through the catch piston central passageway and to the atmosphere while the stunning rod is being driven rearward. The method may also provide a head contact at the housing front end movable between a deactivated position and a position contacting the animal, the head contact in the position contacting the animal permitting air to flow from the supply passageway to urge the catch piston from the first position to the second position. The method may still further provide the catch piston being held in the first position by a buildup of pressurized fluid within the catch piston chamber forward of a catch release piston portion and rearward of a catch retainer, the pressurized fluid being supplied from the supply passageway.

The present invention is further directed to a pneumatic animal stunner comprising a housing having a catch piston chamber, a stunning rod chamber, and a front end forward of the stunning rod chamber. A supply passageway in the housing supplies pressurized fluid from a source of pressurized fluid to a rearward end of the stunning rod chamber. A stunning rod is slideable within the stunning rod chamber and is capable of being driven forward along a longitudinal axis towards and out of the front end of the housing. A stunning rod piston is connected to the stunning rod and is slideable within the stunning rod chamber. At least one resilient cushion is disposed at a front of the stunning rod chamber to stop the stunning rod and stunning rod piston when the stunning rod piston reaches the front of the stunning rod chamber. An internal passageway in the housing supplies pressurized fluid from a source of pressurized fluid to the front of the stunning rod chamber alongside the at least one resilient cushion. Pressurized fluid may flow from the source alternately through the supply passageway into the rearward end of the stunning rod chamber to drive the stunning rod forward, and through the internal passageway into the forward end of the stunning rod chamber alongside the at least one resilient cushion to drive the stunning rod rearward.

The pneumatic animal stunner may include a pair of resilient annular cushions disposed at a front of the stunning rod chamber, and wherein the internal passageway has an opening at the front of the stunning rod chamber between the resilient annular cushions.

The present invention is still further directed to a method of stunning an animal. The method provides: a housing having a catch piston chamber, a stunning rod chamber and a front end forward of the stunning rod chamber; a supply passageway in the housing to supply pressurized fluid from a source of pressurized fluid to a rearward end of the stunning rod chamber; a stunning rod slideable within the stunning rod chamber capable of being driven forward along a longitudinal axis towards and out of the front end of the housing; a stunning rod piston connected to the stunning rod and slideable within the stunning rod chamber; at least one resilient cushion disposed at a front of the stunning rod chamber to stop the stunning rod and stunning rod piston when the stunning rod piston reaches the front of the stunning rod chamber; and an internal passageway in the housing to supply pressurized fluid from a source of pressurized fluid to the front of the stunning rod chamber alongside the at least one resilient cushion. The method includes the step of causing pressurized fluid to flow from the source alternately through the supply passageway into the rearward end of the stunning rod chamber to drive the stunning rod forward, and through the internal passageway into the forward end of the stunning rod chamber alongside the at least one resilient cushion to drive the stunning rod rearward.

In an embodiment, the method may further provide a pair of resilient annular cushions disposed at a front end of the stunning rod chamber. The internal passageway may have an opening at the front of the stunning rod chamber between the resilient annular cushions. The method may further include the step of causing pressurized fluid to flow through the internal passageway into the forward end of the stunning rod chamber between the pair of resilient annular cushions to drive the stunning rod rearward.

The present invention may further be directed to a pneumatic animal stunner comprising a housing having a catch piston chamber, a stunning rod chamber and a front end forward of the stunning rod chamber. A supply passageway in the housing supplies pressurized fluid from a source of pressurized fluid to a rearward end of the stunning rod chamber. A stunning rod is slideable within the stunning rod chamber and capable of being driven forward along a longitudinal axis towards and out of the front end of the housing. A stunning rod piston is connected to the stunning rod and slideable within the stunning rod chamber. A head contact at the housing front end has a rear portion extending through an opening in a front end of the stunning rod chamber, the head contact being movable between a deactivated position and a position contacting the animal, the head contact in the deactivated position blocking flow of pressurized fluid from the source to the rearward end of the stunning rod chamber, the head contact in the position contacting the animal permitting air to flow from the supply passageway to urge the catch piston from the first position to the second position. An internal passageway in the housing supplies pressurized fluid from a source of pressurized fluid to the front of the stunning rod chamber. A passageway is disposed between the head contact rear portion and the opening in the front end of the stunning rod chamber. When the head contact is in the position contacting the animal, pressurized fluid may flow from the source through the supply passageway into the rearward end of the stunning rod chamber to drive the stunning rod forward, and when the pressurized fluid flows through the internal passageway into the forward end of the stunning rod chamber to drive the stunning rod rearward, a portion of the pressurized fluid flows through the passageway between the head contact rear portion and the opening in the front end of the stunning rod chamber to move the head contact into the deactivated position blocking flow of pressurized fluid from the source to the rearward end of the stunning rod chamber.

In an embodiment, the head contact includes a rear projection extending through the opening in a front end of the stunning rod chamber and the passageway between the head contact rear portion and the opening in the front end of the stunning rod chamber comprises a plurality of slots formed in a periphery of the head contact rear projection. The pneumatic animal stunner may further include at least one resilient cushion disposed at a front end of the stunning rod chamber to stop the stunning rod and stunning rod piston when the stunning rod piston reaches the front of the stunning rod chamber. An internal passageway in the housing may supply pressurized fluid from a source of pressurized fluid to the front of the stunning rod chamber alongside the at least one resilient annular cushion. Pressurized fluid may flow from the source alternately through the supply passageway into the rearward end of the stunning rod chamber to drive the stunning rod forward, and through the internal passageway into the forward end of the stunning rod chamber alongside the at least one resilient cushions to drive the stunning rod rearward.

The present invention may also be directed to a method of stunning an animal. The method provides: a housing having a catch piston chamber, a stunning rod chamber and a front end forward of the stunning rod chamber; a housing having a catch piston chamber, a stunning rod chamber and a front end forward of the stunning rod chamber; a supply passageway in the housing to supply pressurized fluid from a source of pressurized fluid to a rearward end of the stunning rod chamber; a stunning rod slideable within the stunning rod chamber capable of being driven forward along a longitudinal axis towards and out of the front end of the housing; a stunning rod piston connected to the stunning rod and slideable within the stunning rod chamber; a head contact at the housing front end having a rear portion extending through an opening in a front end of the stunning rod chamber, the head contact being movable between a deactivated position and a position contacting the animal, the head contact in the deactivated position blocking flow of pressurized fluid from the source to the rearward end of the stunning rod chamber, the head contact in the position contacting the animal permitting air to flow from the supply passageway to urge the catch piston from the first position to the second position; an internal passageway in the housing to supply pressurized fluid from a source of pressurized fluid to the front of the stunning rod chamber; and a passageway between the head contact rear portion and the opening in the front end of the stunning rod chamber. The method includes the steps of contacting the animal with the head contact to permit pressurized fluid to flow from the source through the supply passageway into the rearward end of the stunning rod chamber to drive the stunning rod forward, and causing the pressurized fluid to flow through the internal passageway into the forward end of the stunning rod chamber to drive the stunning rod rearward, whereupon a portion of the pressurized fluid flows through the passageway between the head contact rear portion and the opening in the front end of the stunning rod chamber to move the head contact into the deactivated position blocking flow of pressurized fluid from the source to the rearward end of the stunning rod chamber.

The head contact may include a rear projection extending through the opening in a front end of the stunning rod chamber and the passageway between the head contact rear portion and the opening in the front end of the stunning rod chamber comprises a plurality of slots formed in a periphery of the head contact rear projection, wherein the portion of the pressurized fluid flows through the slots in the head contact rear projection to move the head contact into the deactivated position blocking flow of pressurized fluid from the source to the rearward end of the stunning rod chamber.

The method may further provide at least one resilient cushion disposed at a front of the stunning rod chamber to stop the stunning rod and stunning rod piston when the stunning rod piston reaches the front of the stunning rod chamber, and an internal passageway in the housing to supply pressurized fluid from a source of pressurized fluid to the front of the stunning rod chamber alongside the at least one resilient cushion. Pressurized fluid may flow from the source alternately through the supply passageway into the rearward end of the stunning rod chamber to drive the stunning rod forward, and through the internal passageway into the forward end of the stunning rod chamber alongside the at least one resilient cushion to drive the stunning rod rearward.

The present invention may still be further directed to a catch piston for use in opening and closing catches in a pneumatic animal stunner, the catches alternately holding and releasing a stunning rod to drive from a neutral position forward to stun the animal. A catch piston body is adapted to be positioned adjacent the catches and slideable within a catch piston chamber, the catch piston having a length and being adapted to move between a first position urging the catches to hold the stunning rod, and a second position permitting the catches to release the stunning rod. A central passageway extends longitudinally through the length of the body. A first passageway in the catch piston body is positioned to align with a housing supply passageway when the catch piston is in the first position permitting air to flow from a source of pressurized air through the first passageway and through the central passageway to a rearward end of the stunning rod. A second passageway in the catch piston body is positioned to align with the supply passageway when the catch piston is in the second position permitting air to flow from the source of pressurized fluid through the second passageway to a forward portion of the stunning rod. A third passageway in the catch piston body permits air to flow from the rearward end of the stunning rod through the catch piston central passageway and to the atmosphere while the stunning rod is being returned to the neutral position.

In an embodiment of the catch piston, the second passageway comprises a slot in an outer wall of the catch piston in alignment with the supply passageway when the catch piston is in the second position permitting pressurized fluid to flow from the source through the supply passageway and the slot to a forward end of the stunning rod chamber.

The present invention may further be directed to a nose for use in aligning and misaligning fluid flow passageways in a pneumatic animal stunner, the passageways for providing pressurized fluid to fire a stunning rod and for venting said pressurized fluid after firing said stunning rod. The nose comprises an outer housing nose having a nose rear wall and an activator chamber disposed therein. A head contact activator is disposed within the outer housing nose and is slideable between a forward position and a rearward position, the head contact activator having a cylindrical projection and a cylindrical body. A head activator chamber passageway extends from a position adjacent the head contact activator. A second passageway extends from a position adjacent the head contact activator. A head contact passageway comprises a slot extending around the periphery of the head contact cylindrical body. A head contact vent is for venting pressurized fluid buildup. When the head contact activator is in the forward position, the head contact passageway aligns with the second passageway and the head contact vent to allow for venting of the pressurized fluid buildup through the head contact vent, and when the head contact activator is in the rearward position, the head contact passageway aligns with the head contact activator chamber passageway and second passageway to supply pressurized fluid to fire the stunning rod.

In an embodiment, the head contact activator may be moved from the forward position to the rearward position by pressing the head contact activator against an animal's head. A main trigger, main handle valve, and a handle vent may further be included, wherein depression of the main trigger may open the main handle valve to supply the pressurized fluid to the head activator chamber passageway via a first valve passage. When the main trigger is undepressed, the head contact passageway may not align with the head activator chamber passageway, and a second valve passage may align with the handle vent to vent any pressurized fluid in the head contact passageway to atmosphere.

The present invention may still further be directed to a system for venting pressurized fluid from a pneumatic animal stunner, comprising a housing having a catch piston chamber, a stunning rod chamber, a tail end, and a front end forward of the stunning rod chamber. A supply passageway is in the housing between a source of pressurized fluid and the catch piston chamber. A stunning rod is slideable within the stunning rod chamber and is capable of being driven forward along a longitudinal axis towards and out of the front end of the housing. A catch cylinder is mounted on the tail end of the housing, and has at least one vent passageway. A catch is mounted within the housing for alternately holding and releasing the stunning rod. A catch piston is disposed adjacent the catch and is in sliding contact within the catch piston chamber. An outer housing nose having a nose rear wall has an activator chamber disposed therein. A head contact activator is disposed within the outer housing nose and is slideable between a forward position and a rearward position. A head activator chamber passageway extends from a position adjacent the head contact activator. A head contact vent for venting pressurized fluid buildup is disposed in the head contact activator. Pressurized fluid built up to drive the stunning rod forward is later vented through the at least one vent passageway of the catch cylinder and the head contact vent.

In an embodiment of the system, pressurized fluid built up in the rearward end of the catch piston chamber may vent through the head contact vent. Pressurized fluid built up in the rearward end of the catch piston chamber may vent through the head contact vent. A plurality of vent passageways may be disposed in the catch cylinder. Pressurized fluid built up in the forward end of the catch piston chamber may vent through the plurality of vent passageways disposed in said catch cylinder.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 5C is a side elevational view of the stunner of FIG. 1.

FIG. 7A is a front perspective view of the catch release piston of the stunner of FIG. 1.

FIG. 7B is a front view of the catch release piston of the stunner of FIG. 1.

FIG. 7C is a cross-sectional view of the catch release piston of the stunner of FIG. 1.

FIG. 11A is a side view of a single one of the catches of the stunner of FIG. 1.

FIG. 11B is an inside perspective view of a single one of the catches of the stunner of FIG. 1.

FIG. 11C is an outside perspective view of a single one of the catches of the stunner of FIG. 1.

DESCRIPTION OF THE EMBODIMENT(S)

In describing the embodiment(s) of the present invention, reference will be made herein to FIGS. 1-17 of the drawings in which like numerals refer to like features of the invention.

Figure 3:
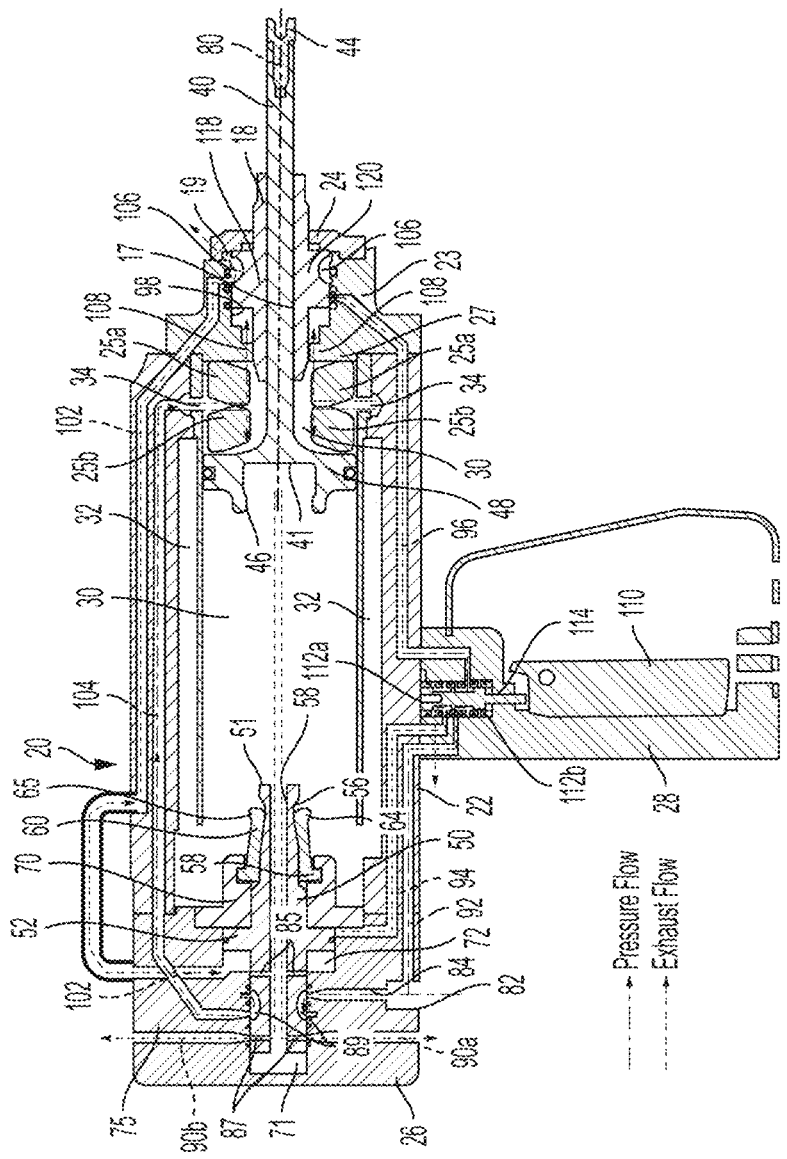
FIG. 3 is a cross-sectional view of the stunner of FIG. 1 after the FIG. 2 firing showing the trigger depressed and the head contact deactivated and the stunning rod in the fully forward, end-of-stroke position.
Figure 4:
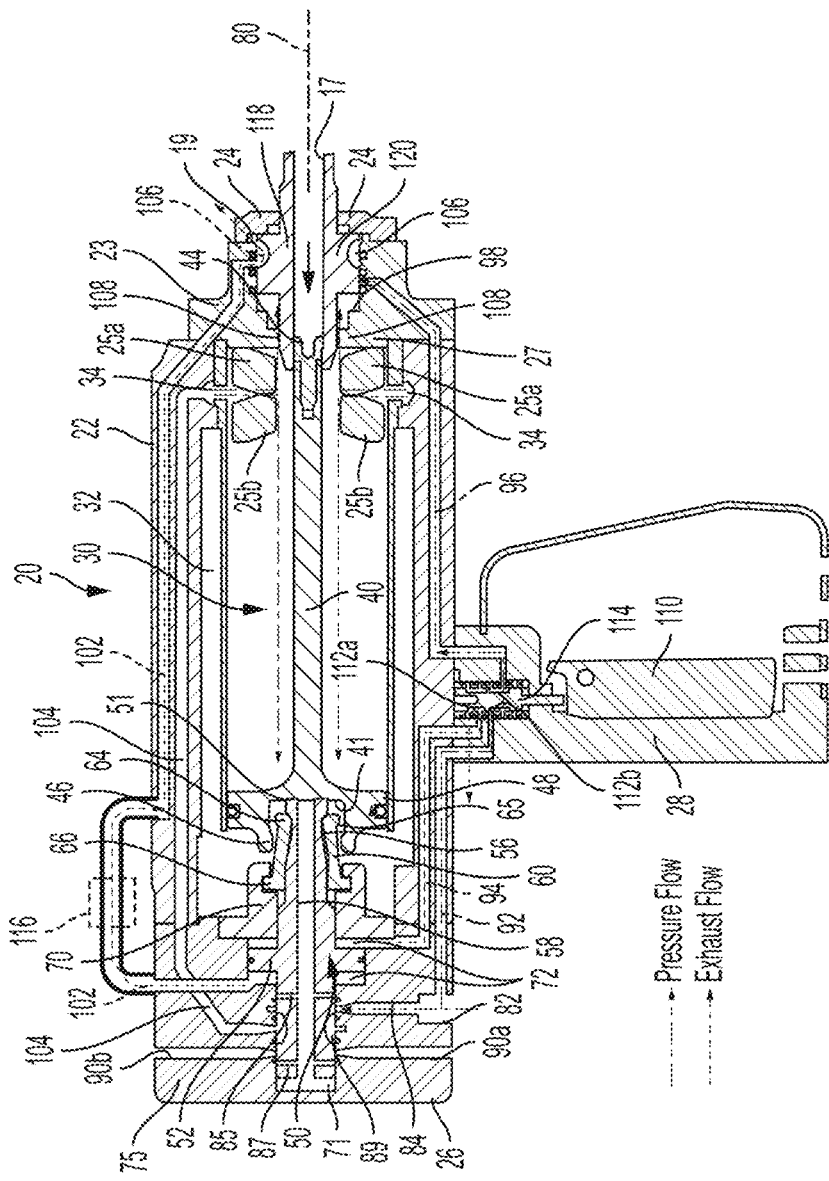
FIG. 4 is a cross-sectional view of the stunner of FIG. 1 after the FIG. 3 end-of-stroke position, showing the trigger depressed and the head contact deactivated and the stunning rod returning rearward and in contact with the front of the catch piston and the catch piston is in an intermediate position, moving rearward, between the second forward position and the first hold position.
Figure 5A:
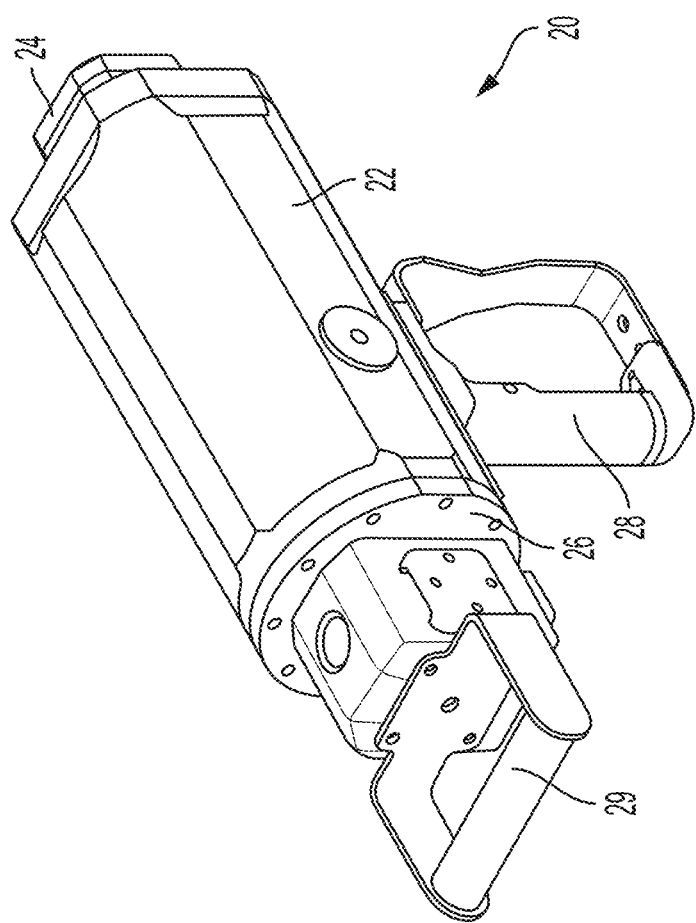
FIG. 5A is a rear perspective view of the stunner of FIG. 1.
Figure 5B:
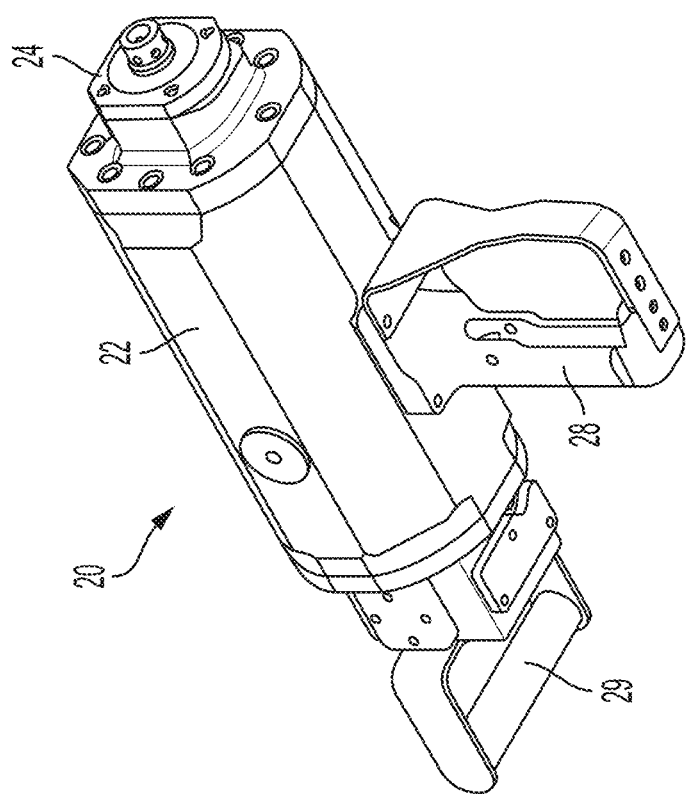
FIG. 5B is a front perspective view of the stunner of FIG. 1.
Figure 6:
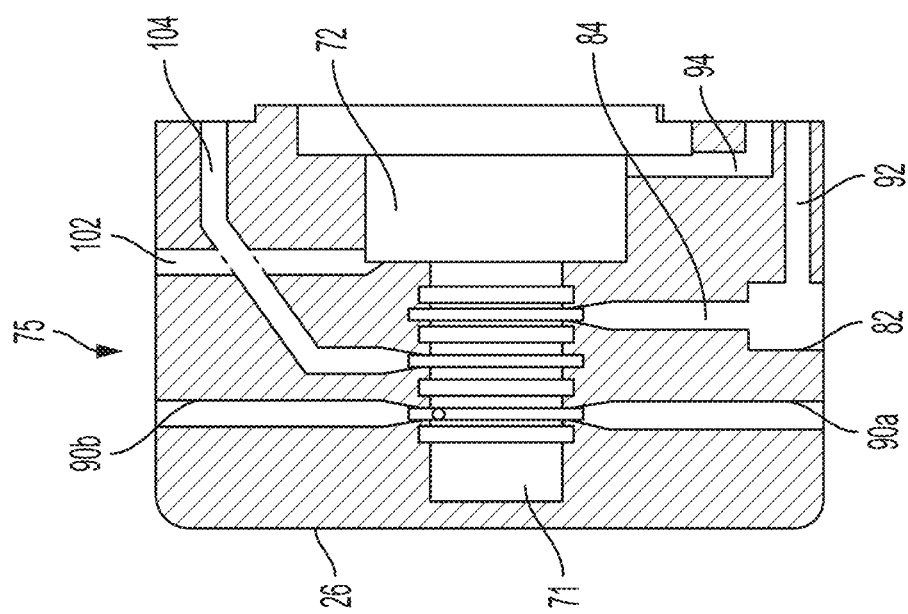
FIG. 6 is a cross-sectional view of the catch cylinder of the stunner of FIG. 1.
Figure 8:
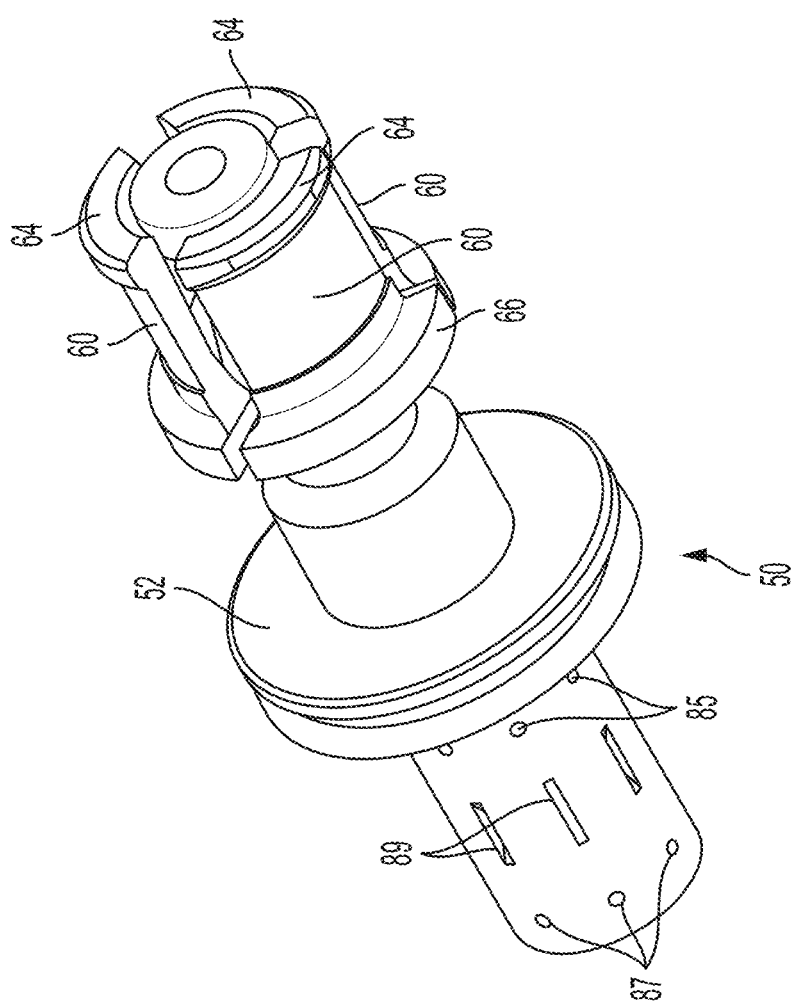
FIG. 8 is a perspective view of the catch release piston and catches of the stunner of FIG. 1.
Figure 9A:
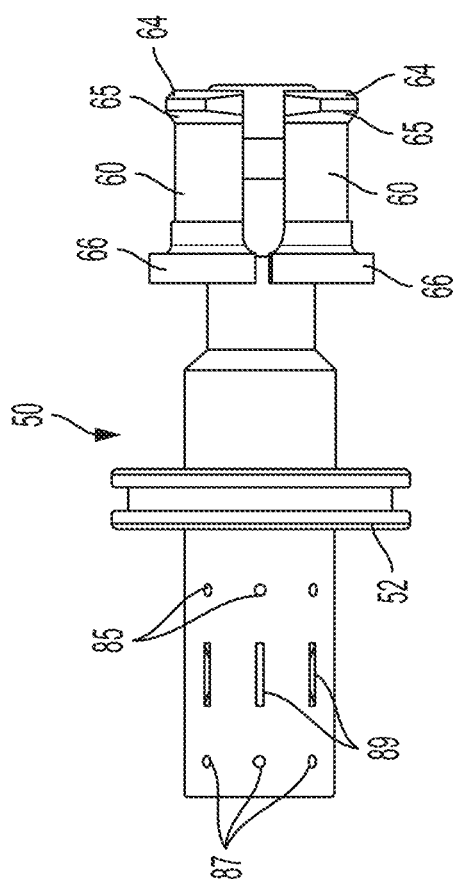
FIG. 9A is a side elevational view of the catch release piston and catches of the stunner of FIG. 1.
Figure 9C:
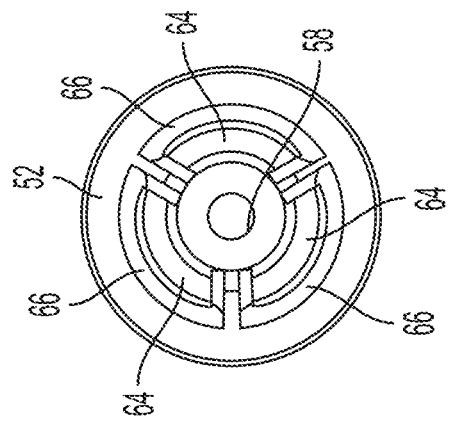
FIG. 9C is a front view of the catch release piston and catches of the stunner of FIG. 1.
Figure 9B:
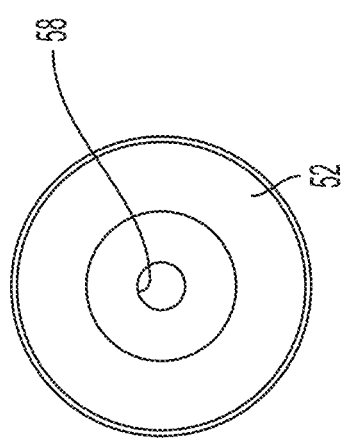
FIG. 9B is a rear view of the catch release piston of the stunner of FIG. 1.
Figure 10D:
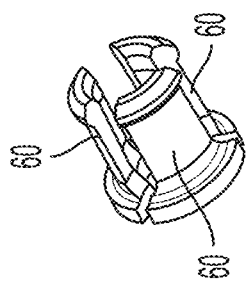
FIG. 10D is a perspective view of the catches of the stunner of FIG. 1.
Figure 10C:
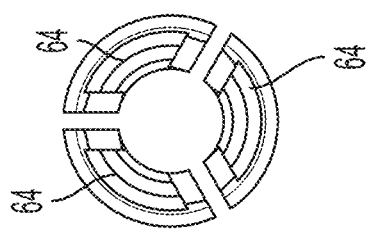
FIG. 10C is a front view of the catches of the stunner of FIG. 1.
Figure 10B:
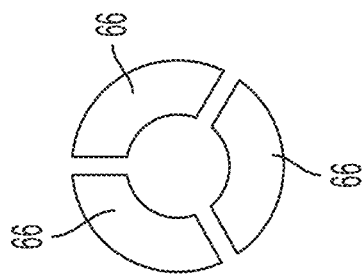
FIG. 10B is a rear view of the catches of the stunner of FIG. 1.
Figure 10A:
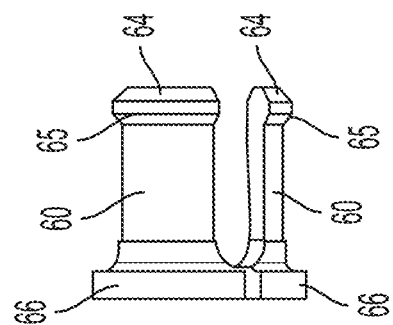
FIG. 10A is a side view of the catches of the stunner of FIG. 1.
Figure 12B:
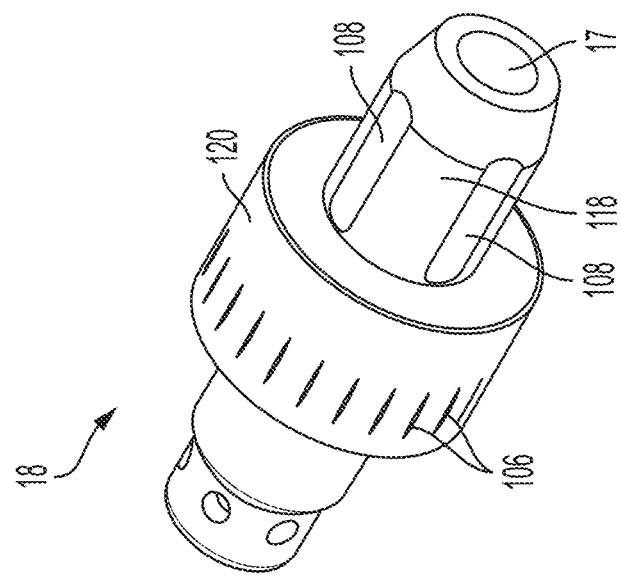
FIG. 12B is a rear perspective view of the head contact activator of the stunner of FIG. 1.
Figure 12A:
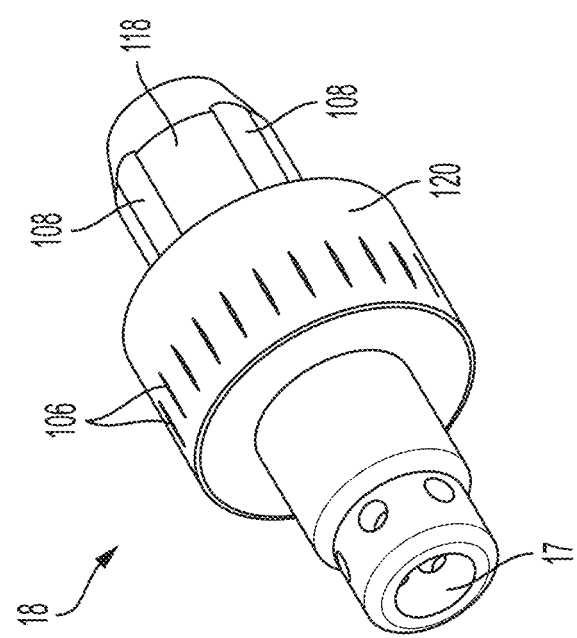
FIG. 12A is a front perspective view of the head contact activator of the stunner of FIG. 1.
Figure 13:
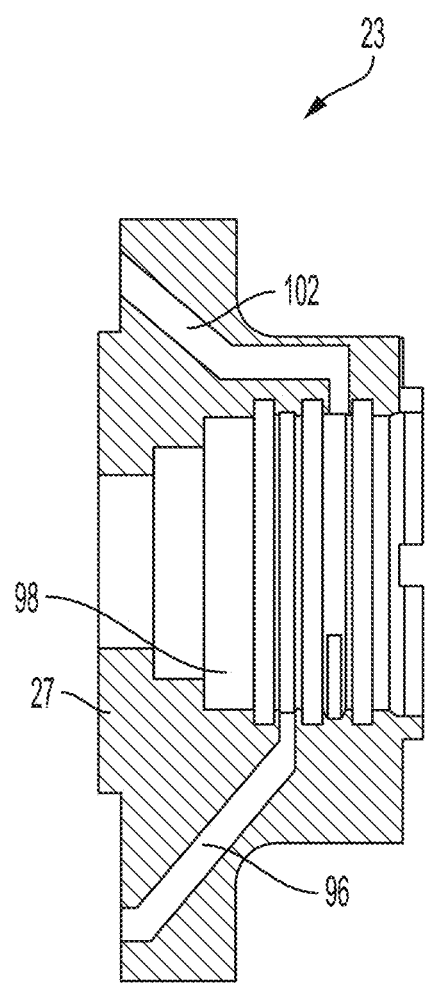
FIG. 13 is a cross-sectional view of the housing nose of the stunner of FIG. 1.
Figure 14:
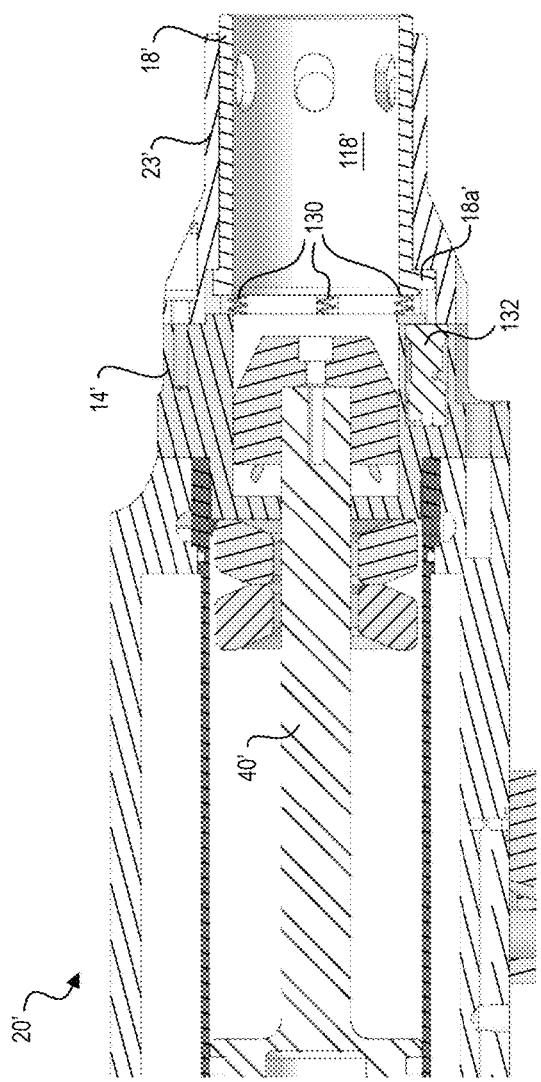
FIG. 14 is a side cross-sectional view of an embodiment of the stunner rod, liner, nose, and head contact configuration with the rod in the fully retracted position.

Structure and operation of the exemplary animal stunner 20 is shown in general in the cross-sections of FIGS. 1-4 and the perspective and side views of FIGS. 5A-5C, and in the components shown in FIGS. 6-13. The stunner 20 includes an outer elongated hollow housing 22, a head contact activator 18 moveable within an outer housing nose 23, a front end 24, a tail end 26, a stunning rod 40 moveable forward and rearward about longitudinal axis 80 and catches 60 arrayed about longitudinal axis 80 for holding and releasing the stunning rod 40. The stunner is grasped by a main handle 28 extending below body 22 and a rear handle 29 extending from tail end 26. The forward and rearward directions described herein are with respect to the stunner front end 24, and inward and outward directions described herein are with respect to axis 80. Housing 22 includes within it a generally cylindrical inner pressure or stunning rod chamber 30 for the stunning rod and piston and a surrounding firing chamber 32 to receive and hold a pressurized fluid.

A circular stunning rod piston 48 surrounded by an O-ring seal 49 slides along the inner cylindrical surface of inner chamber 30 within housing 22. Piston 48 moves forward and rearward along axis 80, and carries stunning rod 40. In the embodiment shown the stunning rod and piston are formed integrally of one piece, but they may be separate components secured together. An annular firing chamber 32 surrounds inner chamber 30 within housing 22 and is open at the rear, so that air can move freely and quickly from firing chamber 32 to the region of inner chamber 30 behind piston 48 upon firing of the stunner, as explained further below. Nose rear wall 27 at front of chamber 30 limits forward motion of piston 48 and stunning rod 40, and carries a pair of resilient annular cushions 25a, 25b. The rearward end 41 of stunning rod 40 has an opening with an inward lip 46 extending about its periphery, which lip is alternately held and released by an outwardly extending flange 64 at the forward end of catch 60. The body or shaft of stunning rod 40 may be circular or non-circular in shape as viewed in cross-section normal to the longitudinal axis. The forward or striking end 44 of the stunning rod may extend in a sliding fit through a correspondingly configured opening 17 in head contact activator 18 at the front of housing 22 to be driven toward the animal's head when the catch releases the stunning rod lip 46. The stunning rod forward end 44 may be sized with a diameter and configuration either to penetrate, or prevent penetration of (i.e. concuss), the animal's head. The example shown in FIGS. 1-5C is of a penetrating rod.

The catch system for holding and releasing the stunning rod as shown in the embodiment is disposed rearward of stunning rod chamber 30 in the rear of housing 22. Catches 60 are further shown in FIGS. 8-11C and in the embodiment shown are three (3) arcuate catches arrayed around axis 80. Each catch may have a body curved in an arc segment about the longitudinal axis, with outwardly extending flanges 64 and 66 at the front and rear ends, respectively. Each catch 60 in the embodiment shown has an arc of more than 90° and less than 120° so that three catches may be arranged cylindrically about the longitudinal axis 80 with sufficient space between adjacent catches to pivot inwardly without interfering with one another. Fewer or more than three catches may be employed. A generally hollow cylindrical catch retainer 70 extends forward from the rear end of housing 22. The front portion of catch retainer 70 extends over and around, and secures the rearward end portions of catches 60. The catch retainer 70 has at its forward end an inwardly facing groove, which receives the catch rear end flanges 66 extending on a side away from axis 80. Catch release piston 50 (see also FIGS. 7A-7C) slides within a central opening in catch cylinder 75 (see also FIG. 6) disposed on stunner tail end 26 and a front portion is slidingly received within the central opening of retainer 70 and moves forward and rearward along axis 80, as shown in cross-section in FIGS. 1-4. Catch piston 50 has circular release piston portion 52 sliding within a cylindrical catch piston chamber 72 behind the rear portion of catch retainer 70. Catch release piston 50 has a central opening 58 extending along axis 80 to forward end 51, and forward of release piston portion 52 catch release piston 50 has a generally cylindrical body portion within and contacting the rearward ends of catches 60 (see also FIGS. 8 and 9A-9C). The support provided to the catch rear end portions by the inner catch piston body and the outer catch retainer permits the catches 60 to rotate and their forward end flanges 64 to pivot inwardly and outwardly around rearward end flanges 66 in the retainer 70 groove.

The catch forward ends may be moved outwardly to a hold position, away from axis 80, so that forward end flanges 64 contact the rod 40 rear end portion and prevent the stunning rod from being driven forward. To accomplish such movement, catch piston 50 has a forward end portion 51 within the catches which has a diameter sufficient to contact and urge catch forward end portion flanges 64 outward into engagement with the stunning rod opening lip 46. When catch piston 50 is moved rearward into the hold position, the catch forward end portion 64 is aligned with and in contact with both the stunning rod opening lip 46 and the catch piston forward end portion 51.

Rearward of the forward end portion 51 the catch piston has a relief portion 56 with a diameter smaller than the forward end portion diameter. This relief portion diameter is sufficiently small to permit catch forward end portion 64 to move freely inward to the release position, with flanges 64 out of engagement with the stunning rod opening lip 46. When catch piston 50 is moved forward from the first, hold position to the second, release position, catch front ends 51 are no longer in a position to prevent catch front end 64 from moving inward. The rearward sides of front flanges 64 are beveled 65 at an angle greater than 90° with the catch body 62 (see also FIGS. 10A-10D and 11A-11C), so that as piston 48 and stunning rod 40 move forward pressure from stunning rod lip 46 will cause flanges 64 to spring inward into relief portion 56 as the stunning rod lip moves along the beveled flange surfaces 65. When the catch forward end flanges 64 are disengaged from rod lip 46, the stunning rod 40 is fully released and may be driven forward.

Stunner 20 may be operated by pressurized fluid, such as compressed air or any other suitable fluid. For the example shown, compressed air is the fluid and is supplied from a hose or line connected to an air compressor. Air pressure and flow may be controlled by a regulator (not shown) and the compressed air flows through into inlet 82 in housing 22, rearward of main handle 28.

Flow of the pressurized air is then split after inlet 82, between internal passageway 84 and trigger supply passageway 92. Internal passageway 84 communicates with catch release piston 50, and the terminus of the passageway may encircle the piston, and trigger supply passageway 92 communicates with main valve 114 operated by trigger 110 in handle 28. A spring (not shown) in valve 114 urges the valve into a first, downward position, and urges the trigger to the undepressed position. When trigger 110 is in the undepressed position, a first passage 112a in main valve 114 permits air to flow from trigger supply passageway 92 to supply passageway 94, in communication with catch piston cylinder chamber 72.

Figure 1:
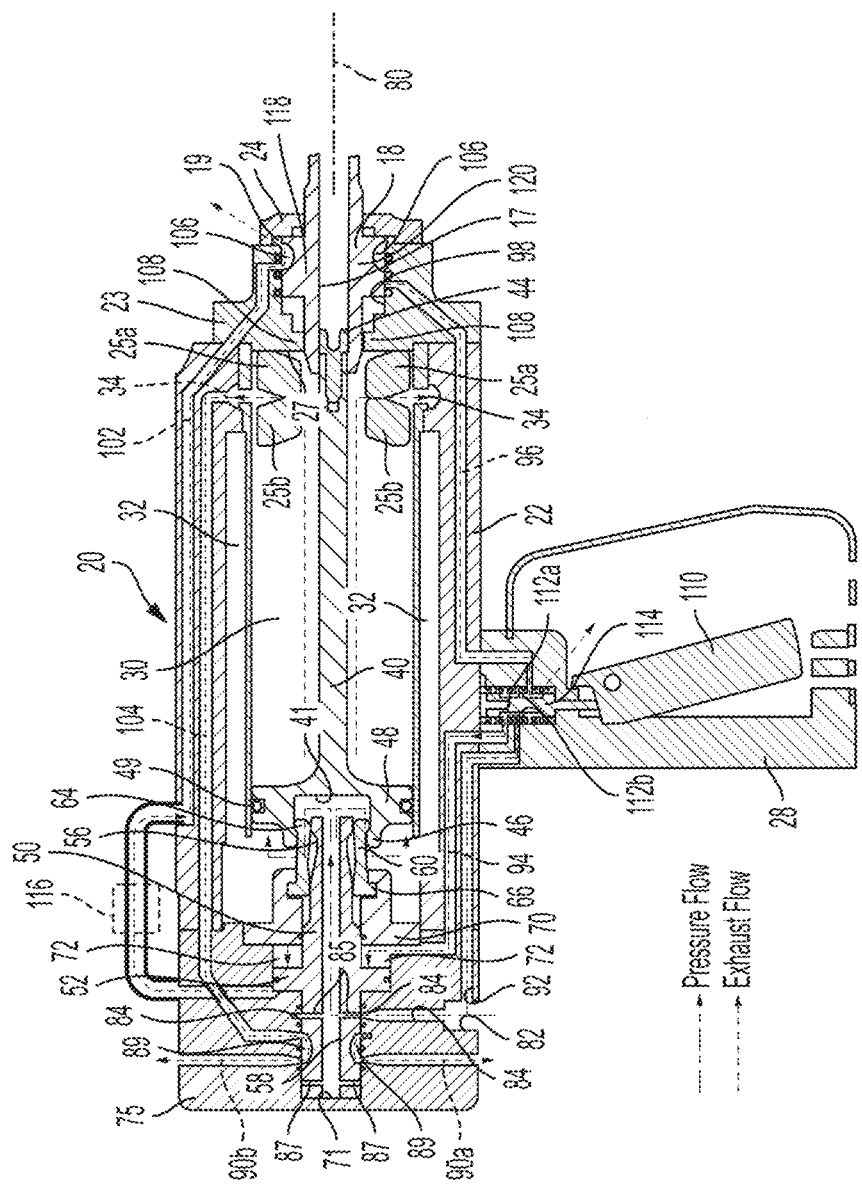
FIG. 1 is a cross-sectional view of an embodiment of the stunner of the present invention with the triggers undepressed, catches, catch piston and stunning rod in the first, neutral hold position as they would be initially before firing, and also after firing when the stunning rod is fully retracted and captured by the catches.

When the pressurized fluid source is connected via inlet 82, catch release piston 50 is locked in the first, rearward hold position, supply trigger 110 is undepressed, and stunner 20 is in a neutral state, as shown in FIG. 1. Air may flow up through passageway 84, the terminus of which may encircle chamber 71 adjacent a rear portion of catch piston 50. One or more first radial passageways 85 extend through the body of catch piston 50 from the periphery to catch piston central opening 58, and passageways 84 and 85 are aligned when catch piston 50 is rearward in the hold position. Because there are spaces between the individual catches 60, pressurized air may flow freely from passageway 84 through passageway 85, through central opening 58 and forward within stunning rod lip 46 to inner chamber 30, behind stunning rod piston 48, and through the open rear end into firing chamber 32 around the inner chamber. To maintain catch release piston 50 in the hold position, alignment of the first slot 112a in main valve 114 in the trigger 110 undepressed position allows pressurized air to flow through supply passageway 94 to catch piston cylinder chamber 72 forward of the catch release piston portion 52 and rearward of catch retainer 70, urging catch piston 50 rearward. This constant pressure holding catch piston 50 is maintained so long as trigger 110 remains undepressed, which ensures the stunning rod 40 does not fire accidentally in the event the stunner is dropped or otherwise mishandled.

Catch piston 50 includes in its body a second passageway 89, rearward of the first passageway 85, which in the embodiment shown comprises an open-top slot in the outer wall of catch piston 50 extending around all or a portion of the circumference of the catch piston. In the hold position of FIG. 1, second passageway 89 is aligned with passageways 90a and 90b, whose ends encircle the catch release piston and are connected, and vent to atmosphere. Second passageway 89 is also aligned with passageway 104, which may encircle the chamber, and which extends forward from catch release piston chamber 71 to the forward end of inner chamber 30 and in communication with one or more openings 34 alongside and between cushions 25a, 25b. Rearward of second passageways 89, third radial passageways 87 extend from central opening 58 to the periphery of the catch piston 50 body.

Pressurized fluid from the rear of firing chamber 32 exerts a force against stunning rod piston 48, which is held from forward movement only by the position of catch flanges 64 retaining stunning rod rear lip 46.

To actuate the firing of stunning rod 40, an embodiment of the present invention may employ main trigger 110, controlling main handle valve 114, in combination with head contact activator 18. In the embodiment shown, a head activator chamber passageway 96 extends through the handle and housing from main valve 114 forward to head contact activator 18. A passageway 102 extends rearward from head contact activator 18 to the back end of catch piston cylinder chamber 72. Passageway 102 does not intersect with passageway 104.

The head contact 18 slides fore and aft within nose 23 forward of chamber 98 (see also FIG. 13) and is extended by spring (not shown) pressure toward a forward (rightward) position. In the forward, deactivated position, the rear portion or cylindrical projection 118 of the head activator 18 extends partially through the opening in the nose rear wall 27 at the rear of the activator chamber 98, and within the opening of forward cushion 25*a*. A head contact passageway 106 comprises a slot extending around the periphery of the cylindrical body 120 of head contact 18. When trigger 110 is undepressed, head contact slot 106 is not aligned with passageway 96, and a second passage 112*b* in valve 114 aligns to vent any air in head activator passage 96 to atmosphere through an opening in the handle 28. When head contact 18 is in the forward position, head contact passageway 106 is aligned with both passageway 102 and head contact vent 19, and when the catch release piston 50 is in the rearward position, catch piston slot 89 is aligned with both passageway 104 and vent passageway 90*b*, so that the rearward end of catch piston cylinder chamber 72 vents through the front of housing 22, via vent 19, and the forward end of inner chamber 30 vents through the rear of housing 22, via vent 90*b*, as shown in FIG. 1. The stunner will not fire in this position, wherein main trigger 110 and head contact 18 are not depressed. Optionally, a second or auxiliary trigger 116 may be provided to open and close flow though passageway 102, which also must be depressed to open passageway 102 and actuate the stunning rod, as discussed further below. Installation of this optional auxiliary trigger 116 may require passageway 102 to be accessed at a point closer to the tail end 26 of the housing to allow for this added safety feature, with no additional change to the flowpath of passageway 102 as shown in FIGS. 1-4 being required.

Figure 2:
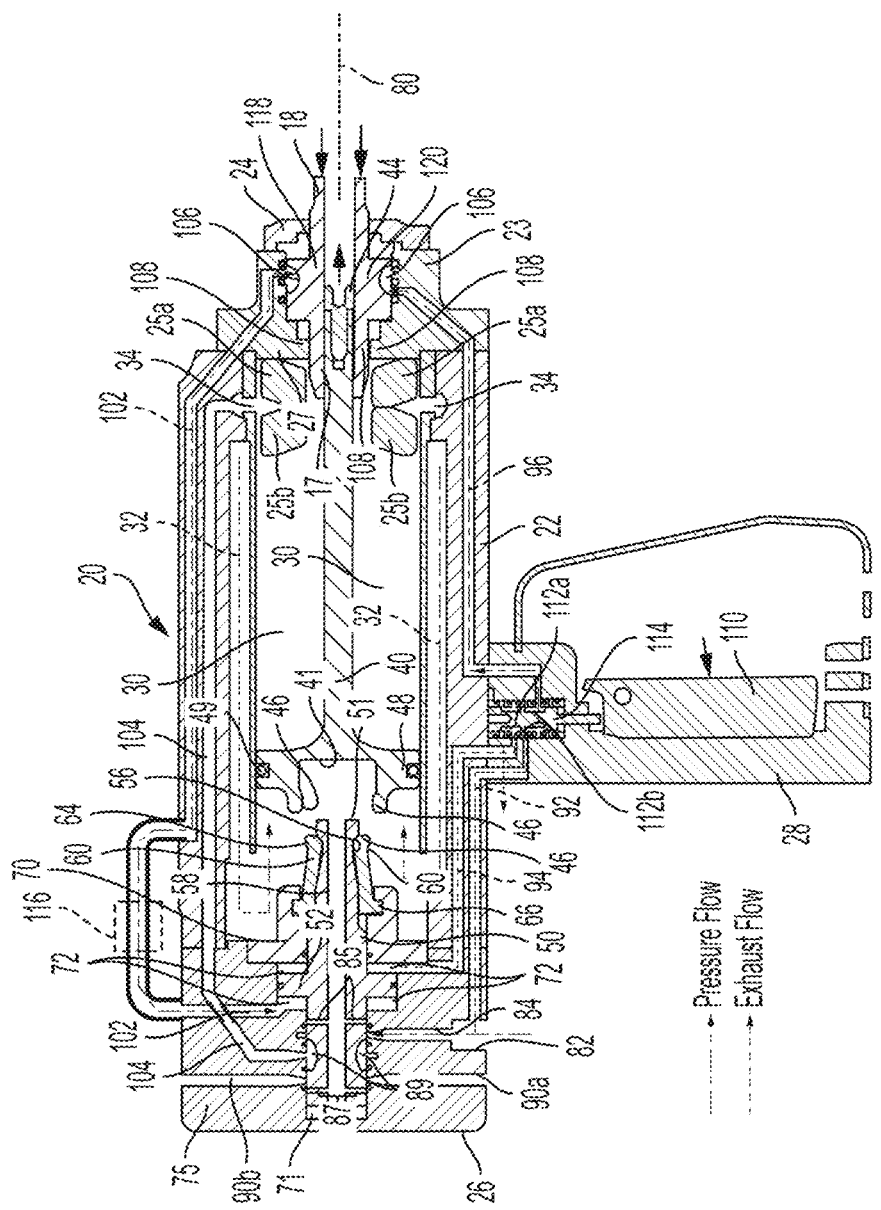
FIG. 2 is a cross-sectional view of the stunner of FIG. 1 after firing showing the trigger depressed and the head contact activated, shortly after the catches have released the stunning rod to move forward and the catch piston is in an intermediate position, moving forward, between the first hold position and the second forward position.

To commence the firing sequence, the main handle valve 114 is activated by the operator depressing main trigger 110 with one hand against the force of the spring in the valve, and head contact 18 is activated by the operator pressing against the animal's head to move and depress the contact 18 rearward (leftward) in the direction shown by the arrows against the force of the head contact spring, as shown in FIG. 2, so the rear portion of the head activator 18 moves further into the opening in the rear of the activator chamber 98. As the main handle valve 114 moves into the second, upward position, valve 114 first passageway 112*a* connects passageway 94 with the handle vent opening and pressurized air from the forward end of catch piston cylinder chamber 72 is exhausted to the atmosphere, and valve 114 second passageway 112*b* connects passageway 92 to passageway 96 to provide pressurized air from inlet 82 to head contact activator 18. Since head contact 18 is in the rearward position, head contact slot 106 aligns with head activator passageway 96 and permits communication between passageways 96 and 102. Compressed air then flows via passageway 102 to the rearward end of catch piston cylinder chamber 72. If the optional auxiliary trigger 116 is used, it must be depressed to open the valve to permit pressurized air flow through passageway 102. As a result of main trigger 110 and head contact 18 being depressed, and optionally auxiliary trigger 116, catch release piston 50 is moved by the compressed air in the rear of chamber 72 and begins to extend forward (rightward) to its limit, against catch retainer 70. This forward movement of end 51 releases catches 60 and permits inward retraction of forward catch latches 64 to relief portion 56. A result of the pressurized air behind stunning rod piston 48, stunning rod lip 46 is urged forward and moves against the catch beveled flange surfaces 65, moving catch forward end flanges inward and releasing stunning rod 40.

The pressure of air from inlet 82 that had flowed through catch piston central opening 58 (FIG. 1) is assisted by pressurized charge air flowing from firing chamber 32 against the rear of piston 48. As a result, as stunning rod 40 is released from the catches it moves forward (rightward) at a high rate of speed, with the stunning rod forward or striking end 44 moving through the head contact opening 17 in the direction of the arrow as shown in FIG. 2. The remaining air in inner chamber 30 forward of the stunning rod piston 48, which previously had been vented (FIG. 1) begins to be compressed.

FIG. 2 shows the catch piston in an intermediate position as it is moved forward from the first, hold position toward the second, release position. Passageway 85 has moved out of alignment from passageway 84, and passageway 84 is consequently closed to prevent the pressurized fluid from flowing from inlet 82. When the catch piston is moved forward toward the release position, operation of valve 114 by depressing the supply trigger does not permit further pressurized fluid to flow from the source into either the inner stunning rod chamber 30 or firing chamber 32 because of the misalignment of supply passageway 84 and catch piston first passageway 85. Because the catch piston 50 has begun to be moved forward toward its second release position, the second passageway slot 89 is not yet aligned with supply passageway 84.

FIG. 3 shows the animal stunner 20 with the stunning rod 40 in the full forward, end-of-stroke position. At the end of the forward stroke of stunning rod 40, piston 48 contacts cushion 25*b*, and both cushions 25*b* and 25*a* at the forward end of stunning rod chamber 30 compress to cause forward motion of piston 48 and rod 40 to decelerate and stop within the stunning rod chamber. The stunning rod striking end 44 is now fully extended through head contact opening 17.

Since the catch piston 50 is still in the second, forward position, pressurized fluid continues to flow from the source through the supply passageway 84, through the slot 89 extending around the catch piston 50 and into internal passageway 104 and through openings 34 into the forward end of the stunning rod chamber 30 at cushions 25*a*, 25*b* ahead of stunning rod piston 48. A portion of the pressurized air flows from the front of stunning rod chamber 30 through a passageway comprising one or more small slots 108 between the rear portion or projection 118 of the head contact activator 18 and the opening in nose rear wall 27 at the rear of the activator chamber 98, which pressurized air along with the spring assist moves the head contact 18 fully forward to its deactivated position. While one or more of these slots 108 may be formed in or around the opening in nose rear wall 27 (FIG. 3), the embodiment shown in FIGS. 12A and 12B for the head contact 18 shows slots 108 comprising four (4) slots or grooves arrayed around and formed in the periphery of the rear portion or projection 118 of the head contact activator. With the head contact 18 in the forward, deactivated position, further flow of pressurized air from main valve 114 through passageway 96 is blocked, and head contact passageway 106 connects passageway 102 to the head contact vent 19 to exhaust air pressure from catch piston cylinder chamber 72 to the atmosphere, so that catch piston 50 is no longer urged forward. This air flow through passageway 108 to push head contact 18 forward acts as a safety feature, so that the stunner can not be repeatedly fired by continuing to press the trigger.

With the catch release piston 50 remaining in the second, forward position, third radial passageways 87 are in alignment with vent passageways 90*a*, 90*b*, and permit air behind piston 48 to flow through catch piston central opening 58 and vent to atmosphere out of housing rear portion 26. Pressurized air being supplied from passageway 104 to the forward end of stunning rod chamber 30 acts against stunning rod piston 48 to begin to drive it rearward.

As shown in FIG. 4, the pressurized air in chamber 30 forward end retracts the stunning rod 40 rearward (leftward; as shown by the arrow) until lip 46 of stunning rod 40 passes behind the front flanges 64 of catches 60, and stunning rod rear end 41 contacts the forward end 51 of catch piston 50. Because catch piston cylinder chamber 72 is fully vented fore and aft of catch release piston portion 52, as stunning rod piston strikes forward end 51, catch release piston 50 is free to begin to move back from the second, forward position toward the first, hold position. In an intermediate position between the second and first positions, the catch piston second passageway 89 moves out of alignment with air supply passageway 84, third passageway 87 moves out of alignment with vent passageways 90*a*, 90*b*, and catch piston first passageway 85 is not yet in alignment with the air supply passageway 82. As a result, in this intermediate position no additional pressurized air is supplied into stunning rod chamber 30 forward of the stunning rod piston 48, and the stunning rod piston 48 is driven back by the remaining air pressure.

However, as a result of the momentum of piston 48 striking it, catch piston 50 is retracted rearward (leftward) into the catch cylinder 75 fully into its first, hold position. This rearward movement closes the catches 60 by the force of catch piston forward end 51 sliding within the catch forward end portions and urging them outward to cause catch forward end flanges 64 to engage and capture stunning rod lip 46, so that the stunning rod 40 is retained by the catches, as shown in FIG. 1. and the stunner is automatically reset. Trigger 110 may be released by the operator, and in its undepressed position as shown in FIG. 1, with catch piston 50 in the first, neutral, hold position, the stunner is again pressurized via air through supply inlet 82 and the initial, downward position of valve 114 as described above, so that pressurized air flows via passageway 94 to urge catch piston portion 52 rearward and prevent catch piston 50 and stunning rod 40 from forward motion, so that the stunner is ready for operation again.

An alternate embodiment of a nose 23' and a head contact activator 18' disposed on a front end 14' of an animal stunner 20' and sized to receive a larger stunning rod 40' having a larger striking end 44' is presented in FIGS. 14-17. This particular nose and head contact configuration is for use in the animal stunner 20' embodiment constructed to prevent penetration of (i.e. concuss) an animal's head, as previously described.

The head contact 18' slides fore and aft within nose 23' forward of chamber 98' and is biased by a spring 130 pressure toward a forward (rightward) position. A nose valve 132 is disposed within the nose 23' and is interactive via the sliding motion of the head contact 18'. In the forward, deactivated position, a cylindrical projection 118' of the head contact activator 18' extends partially through the opening in the front end of the nose 23', and is disengaged with the nose valve 132. The stunner will not fire in this position, wherein main trigger 110 and head contact 18' are not depressed.

Figure 15:
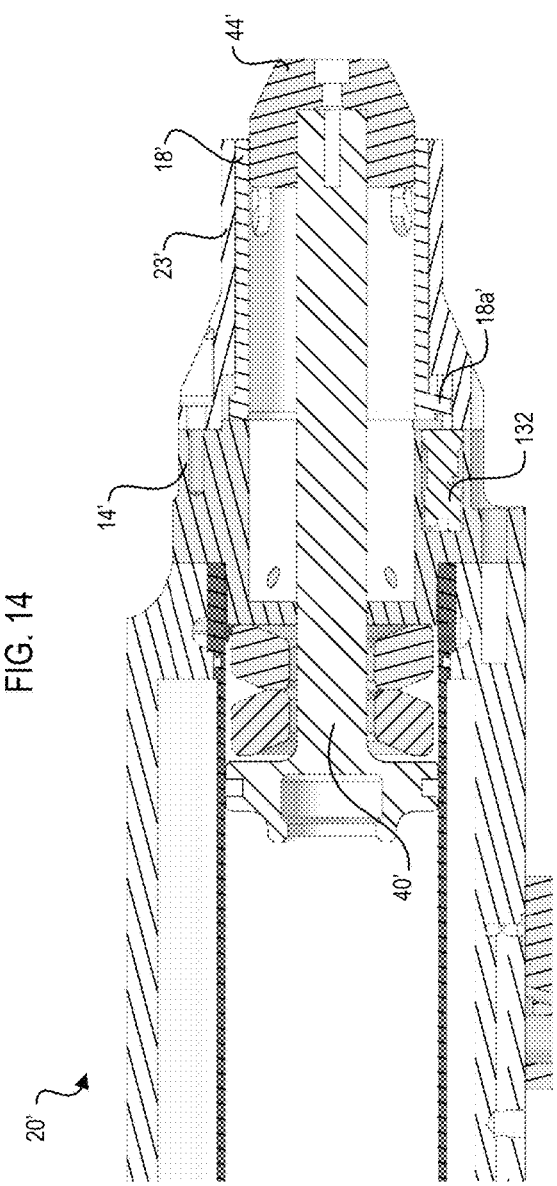
FIG. 15 is a side cross-sectional view of the animal stunner configuration of FIG. 14 with the rod in the fully extended position.
Figure 16:
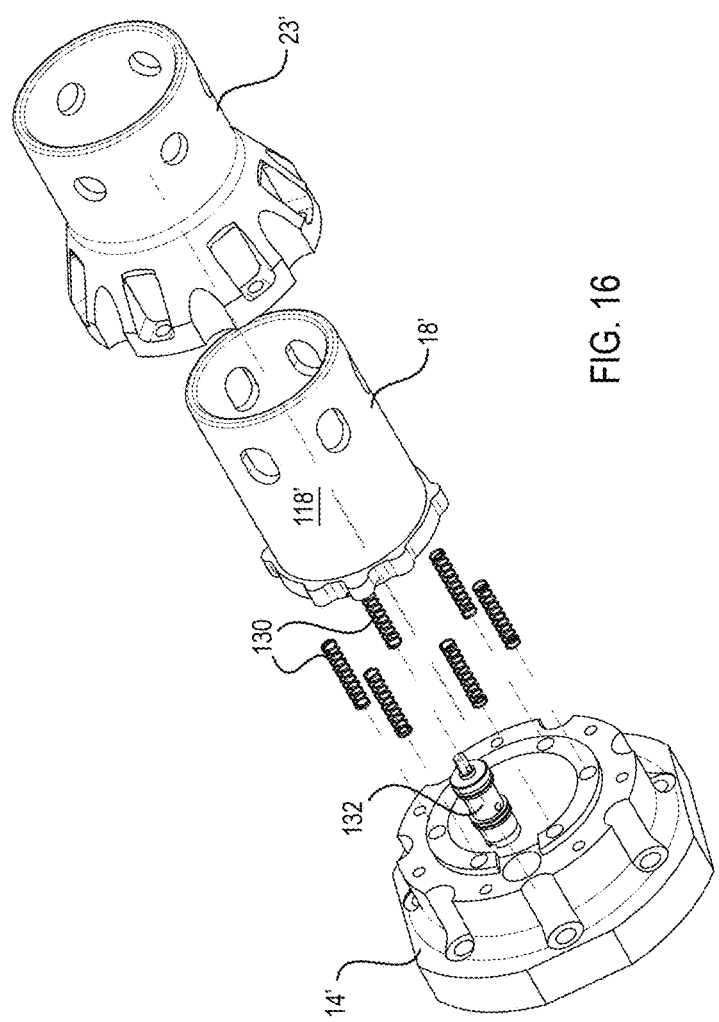
FIG. 16 is a perspective exploded view of the nose and head contact configuration of the stunner embodiment of FIG. 14.
Figure 17:
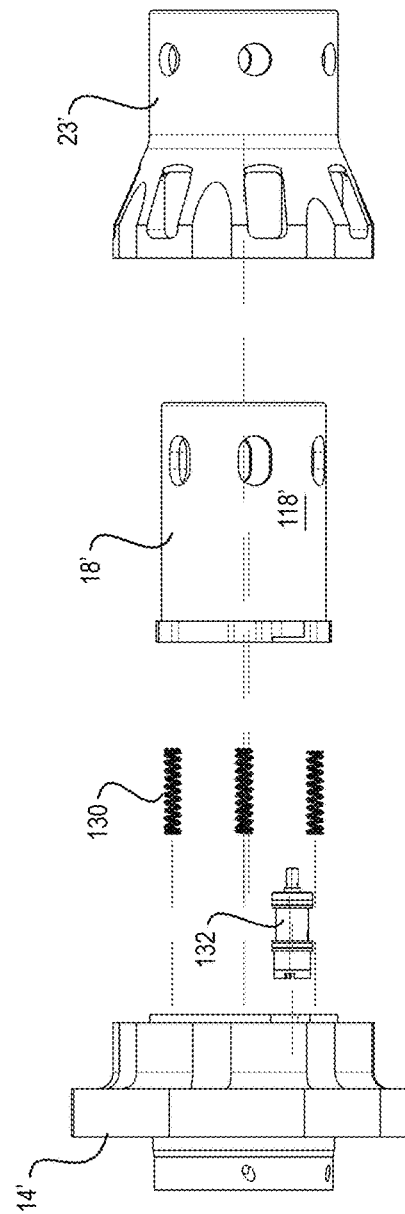
FIG. 17 is a side exploded view of the nose and head contact configuration of the stunner embodiment of FIG. 14.

To commence the firing sequence, the main handle valve 114 is activated by the operator depressing the main trigger 110 with one hand (and optionally auxiliary trigger 116 with the other hand) against the force of the spring in the valve 114, and nose valve 132 is activated by the operator pressing the head contact 18' against the animal's head to move and depress the head contact 18' rearward (leftward) against the force of the springs 130, as shown in FIG. 15, such that a head contact tab 18*a*' extending from the rear portion of the head contact 18' engages with the nose valve 132 to activate it and allow for the passage of fluid.

The larger striking end 44' of the stunning rod 40' used in the stunner 20' has a larger diameter than that of its penetrating counterpart 44 as previously described. This striking end 44' is affixed to the end of the rod 40' by a bolt, screw, nail, or other acceptable fastening means. The inner diameter of head contact 18' conforms to this striking end 44' diameter to allow for a sliding fit, such that the rod does not rattle or otherwise displace itself during the firing sequence.

The remainder of the firing sequence and construction of the stunner 20' is similar to that as described above for the penetrating stunner 20, and other salient features of the concussion stunner 20' may alternately be constructed as described in U.S. Pat. No. 10,375,969 titled "CONCUSSION STUNNER ROD AND NOSE", the disclosure of which is hereby incorporated by reference.

The stunner and its components may be made of steel, aluminum, composite or other suitable materials. For example, the stunning rod may be constructed as described in U.S. Pat. No. 10,258,051 titled "LIGHTWEIGHT STUNNING ROD", the disclosure of which is hereby incorporated by reference. The construction of the stunner shown is sufficiently robust so that it will avoid accidental firing if dropped by the operator.

The present invention therefore provides a pneumatic animal stunner and method of use that has one or more of the following advantages: 1) reduction in the complexity of valve and venting systems; 2) reduced cost to manufacture the stunner; 3) reduction in weight of an automatically retracting stunner; 4) reduced operator fatigue in using the stunner; 5) reduced pressure of the pressurized fluid needed to operate the stunner, which may be below 175 psi (1.3 MPa) and as low as about 125 psi (1 MPa) and rugged construction to avoid accidental firing and damage.

While the present invention has been particularly described, in conjunction with a specific preferred embodiment, it is evident that many alternatives, modifications and variations will be apparent to those skilled in the art in light of the foregoing description. It is therefore contemplated that the description and claims herein will embrace any such alternatives, modifications and variations as falling within the true scope and spirit of the present invention.

Thus, having described the invention,

What is claimed is:

1. A pneumatic animal stunner comprising:
    a housing having a catch piston chamber, a stunning rod chamber and a front end forward of the stunning rod chamber;
    a supply passageway in the housing between a source of pressurized fluid and the catch piston chamber;
    a stunning rod slideable within the stunning rod chamber capable of being driven forward along a longitudinal axis towards and out of the front end of the housing;
    a catch mounted within the housing for alternately holding and releasing the stunning rod;
    a catch piston disposed adjacent the catch and in sliding contact within the catch piston chamber, the catch piston being adapted to move between a first position urging the catch to hold and prevent the stunning rod from being driven forward, and a second position permitting the catch to release and permit the stunning rod to be driven forward;

a first passageway in the catch piston in alignment with the housing supply passageway when the catch piston is in the first position permitting air to flow from the source of pressurized fluid through the first passageway to a rearward end of the stunning rod chamber; and a second passageway in the catch piston in alignment with the supply passageway when the catch piston is in the second position permitting air to flow from the source of pressurized fluid through the second passageway to a forward end of the stunning rod chamber;

wherein when the catch piston is in the first position, pressurized fluid may flow from the source through the supply passageway and the first passageway into the rearward end of the stunning rod chamber to drive the stunning rod forward upon release of the catch, and when the catch piston is in the second position after releasing the catch, pressurized fluid may flow from the source through the supply passageway and the second passageway into the forward end of the stunning rod chamber to drive the stunning rod rearward.

2. The pneumatic animal stunner of claim 1 wherein, when the catch piston is in the second position after releasing the catch, pressurized fluid may flow from the source through the supply passageway and the second passageway into the forward end of the stunning rod chamber to drive the stunning rod rearward and cause the catch piston to move again to the first position urging the catch to hold and prevent the stunning rod from being driven forward.

3. The pneumatic animal stunner of claim 2 further including a stunning rod piston connected to the stunning rod and slideable within the stunning rod chamber and a pair of cushions at a front end of the stunning rod chamber to cushion stopping of the stunning rod and stunning rod piston when the stunning rod piston reaches the front of the stunning rod chamber.

4. The pneumatic animal stunner of claim 3 further including an internal passageway in the housing extending from the catch piston chamber to the front of the stunning rod chamber between the pair of cushions and wherein, when the catch piston is in the second position, pressurized fluid may flow from the source through the second passageway in the catch piston and the internal passageway into the forward end of the stunning rod chamber between the pair of cushions to drive the stunning rod rearward.

5. The pneumatic animal stunner of claim 1 further including an on/off main valve in the housing to control flow of pressurized fluid from the source to the supply passageway.

6. The pneumatic animal stunner of claim 1 wherein the catch piston includes a central passageway, and wherein the first passageway extends from the central passageway to the supply passageway when the catch piston is in the first position to supply pressurized fluid through the central passageway to the rearward end of the stunning rod chamber.

7. The pneumatic animal stunner of claim 6 further including a third passageway in the catch piston permitting air to flow from the rearward end of the stunning rod chamber through the catch piston central passageway and to the atmosphere while the stunning rod is being driven rearward.

8. The pneumatic animal stunner of claim 1 wherein the catch piston second passageway comprises a slot in an outer wall of the catch piston in alignment with the supply passageway when the catch piston is in the second position permitting pressurized fluid to flow from the source through the supply passageway and the slot to a forward end of the stunning rod chamber.

9. The pneumatic animal stunner of claim 1 further including an internal passageway in the housing extending from the catch piston chamber to the front of the stunning rod chamber and wherein the catch piston second passageway comprises a slot in an outer wall of the catch piston in alignment with the supply passageway and the internal passageway when the catch piston is in the second position to permit pressurized fluid to flow from the source through the supply passageway, the slot in the catch piston and the internal passageway into the forward end of the stunning rod chamber to drive the stunning rod rearward.

10. The pneumatic animal stunner of claim 1 further including a head contact at the housing front end movable between a deactivated position and a position contacting the animal, the head contact in the position contacting the animal permitting air to flow from the supply passageway to urge the catch piston from the first position to the second position.

11. A method of stunning an animal comprising:

providing a housing having a catch piston chamber, a stunning rod chamber and a front end forward of the stunning rod chamber;

providing a supply passageway in the housing between a source of pressurized fluid and the catch piston chamber;

providing a stunning rod slideable within the stunning rod chamber capable of being driven forward along a longitudinal axis towards and out of the front end of the housing;

providing a catch mounted within the housing for alternately holding and releasing the stunning rod;

providing a catch piston disposed adjacent the catch and in sliding contact within the catch piston chamber, the catch piston being adapted to move between a first position urging the catch to hold and prevent the stunning rod from being driven forward, and a second position permitting the catch to release and permit the stunning rod to be driven forward;

providing a first passageway in the catch piston in alignment with the housing supply passageway when the catch piston is in the first position permitting air to flow from the source of pressurized fluid through the first passageway to a rearward end of the stunning rod chamber;

providing a second passageway in the catch piston in alignment with the supply passageway when the catch piston is in the second position permitting air to flow from the source of pressurized fluid through the second passageway to a forward end of the stunning rod chamber;

moving the catch piston into the first position urging the catch to hold and prevent the stunning rod from being driven forward;

moving the catch piston toward the second position to release the catch;

causing pressurized fluid to flow from the source through the first passageway into the rearward end of the stunning rod chamber to drive the stunning rod forward upon release of the catch to stun the animal, and upon movement of the catch piston into the second position, pressurized fluid flows from the source through the second passageway into the forward end of the stunning rod chamber to drive the stunning rod rearward.

12. The method of claim 11 wherein, when the catch piston is in the second position after releasing the catch, pressurized fluid flows from the source through the second passageway into the forward end of the stunning rod chamber to drive the stunning rod rearward and cause the catch piston to move again to the first position urging the catch to hold and prevent the stunning rod from being driven forward.

13. The method of claim 11 further including:
providing a stunning rod piston connected to the stunning rod and slideable within the stunning rod chamber;
providing a pair of cushions at a front of the stunning rod chamber to cushion stopping of the stunning rod and stunning rod piston when the stunning rod piston reaches the front of the stunning rod chamber; and
providing an internal passageway in the housing extending from the catch piston chamber to the front of the stunning rod chamber between the pair of cushions; and wherein
upon movement of the catch piston to the second position, pressurized fluid flows from the source through the second passageway in the catch piston and the internal passageway into the forward end of the stunning rod chamber between the pair of cushions to drive the stunning rod rearward.

14. The method of claim 11 further including providing in the catch piston a central passageway, and wherein the first passageway extends from the central passageway to the supply passageway when the catch piston is in the first position to supply pressurized fluid through the central passageway to the rearward end of the stunning rod chamber.

15. The method of claim 11 wherein the catch piston second passageway comprises a slot in an outer wall of the catch piston in alignment with the supply passageway when the catch piston is in the second position permitting pressurized fluid to flow from the source through the supply passageway and the slot to a forward end of the stunning rod chamber.

16. The method of claim 11 further including providing an internal passageway in the housing extending from the catch piston chamber to the front of the stunning rod chamber and wherein the catch piston second passageway comprises a slot in an outer wall of the catch piston in alignment with the supply passageway and the internal passageway when the catch piston is in the second position to permit pressurized fluid to flow from the source through the supply passageway, the slot in the catch piston and the internal passageway into the forward end of the stunning rod chamber to drive the stunning rod rearward.

17. The method of claim 11 further including providing a third passageway in the catch piston permitting air to flow from the rearward end of the stunning rod chamber through a catch piston central passageway and to the atmosphere while the stunning rod is being driven rearward.

18. The method of claim 11 further including providing a head contact at the housing front end movable between a deactivated position and a position contacting the animal, the head contact in the position contacting the animal permitting air to flow from the supply passageway to urge the catch piston from the first position to the second position.

19. The method of claim 11 wherein the catch piston is held in the first position by a buildup of pressurized fluid within the catch piston chamber forward of a catch release piston portion and rearward of a catch retainer, the pressurized fluid being supplied from the supply passageway.

20. A pneumatic animal stunner comprising:
a housing having a catch piston chamber, a stunning rod chamber and a front end forward of the stunning rod chamber;
a supply passageway in the housing to supply pressurized fluid from a source of pressurized fluid to a rearward end of the stunning rod chamber;
a stunning rod slideable within the stunning rod chamber capable of being driven forward along a longitudinal axis towards and out of the front end of the housing;
a stunning rod piston connected to the stunning rod and slideable within the stunning rod chamber;
at least one resilient cushion disposed at a front of the stunning rod chamber to cushion stopping of the stunning rod and stunning rod piston when the stunning rod piston reaches the front of the stunning rod chamber; and
an internal passageway in the housing to supply pressurized fluid from a source of pressurized fluid to the front of the stunning rod chamber alongside the at least one resilient cushion,
wherein, pressurized fluid may flow from the source alternately through the supply passageway into the rearward end of the stunning rod chamber to drive the stunning rod forward, and through the internal passageway into the forward end of the stunning rod chamber alongside the at least one resilient cushion to drive the stunning rod rearward.

21. The pneumatic animal stunner of claim 20 including a pair of resilient annular cushions disposed at a front of the stunning rod chamber, and wherein the internal passageway has an opening at the front of the stunning rod chamber between the resilient annular cushions.

22. A method of stunning an animal comprising:
providing a housing having a catch piston chamber, a stunning rod chamber and a front end forward of the stunning rod chamber;
providing a supply passageway in the housing to supply pressurized fluid from a source of pressurized fluid to a rearward end of the stunning rod chamber;
providing a stunning rod slideable within the stunning rod chamber capable of being driven forward along a longitudinal axis towards and out of the front end of the housing;
providing a stunning rod piston connected to the stunning rod and slideable within the stunning rod chamber;
providing at least one resilient cushion disposed at a front of the stunning rod chamber to cushion stopping of the stunning rod and stunning rod piston when the stunning rod piston reaches the front of the stunning rod chamber;
providing an internal passageway in the housing to supply pressurized fluid from a source of pressurized fluid to the front of the stunning rod chamber alongside the at least one resilient cushion; and
causing pressurized fluid to flow from the source alternately through the supply passageway into the rearward end of the stunning rod chamber to drive the stunning rod forward, and through the internal passageway into the forward end of the stunning rod chamber alongside the at least one resilient cushion to drive the stunning rod rearward.

23. The method of claim 22 further including providing a pair of resilient annular cushions disposed at a front end of the stunning rod chamber, and wherein the internal passageway has an opening at the front of the stunning rod chamber between the resilient annular cushions, and causing pressurized fluid to flow through the internal passageway into the forward end of the stunning rod chamber between the pair of resilient annular cushions to drive the stunning rod rearward.

24. A pneumatic animal stunner comprising:
a housing having a catch piston chamber, a stunning rod chamber and a front end forward of the stunning rod chamber;
a supply passageway in the housing to supply pressurized fluid from a source of pressurized fluid to a rearward end of the stunning rod chamber;
a stunning rod slideable within the stunning rod chamber capable of being driven forward along a longitudinal axis towards and out of the front end of the housing;
a stunning rod piston connected to the stunning rod and slideable within the stunning rod chamber;
a head contact at the housing front end having a rear portion extending through an opening in a front end of the stunning rod chamber, the head contact being movable between a deactivated position and a position contacting the animal, the head contact in the deactivated position blocking flow of pressurized fluid from the source to the rearward end of the stunning rod chamber, the head contact in the position contacting the animal permitting air to flow from the supply passageway to urge the catch piston from the first position to the second position;
an internal passageway in the housing to supply pressurized fluid from a source of pressurized fluid to the front of the stunning rod chamber; and
a passageway between the head contact rear portion and the opening in the front end of the stunning rod chamber,
wherein, when the head contact is in the position contacting the animal pressurized fluid may flow from the source through the supply passageway into the rearward end of the stunning rod chamber to drive the stunning rod forward, and when the pressurized fluid flows through the internal passageway into the forward end of the stunning rod chamber to drive the stunning rod rearward, a portion of the pressurized fluid flows through the passageway between the head contact rear portion and the opening in the front end of the stunning rod chamber to move the head contact into the deactivated position blocking flow of pressurized fluid from the source to the rearward end of the stunning rod chamber.

25. The pneumatic animal stunner of claim 24 wherein the head contact includes a rear projection extending through the opening in a front end of the stunning rod chamber and the passageway between the head contact rear portion and the opening in the front end of the stunning rod chamber comprises a plurality of slots formed in a periphery of the head contact rear projection.

26. The pneumatic animal stunner of claim 24 further including:
at least one resilient cushion disposed at a front end of the stunning rod chamber to cushion stop the stunning rod and stunning rod piston when the stunning rod piston reaches the front of the stunning rod chamber; and
an internal passageway in the housing to supply pressurized fluid from a source of pressurized fluid to the front of the stunning rod chamber alongside the at least one resilient cushion,
wherein, pressurized fluid may flow from the source alternately through the supply passageway into the rearward end of the stunning rod chamber to drive the stunning rod forward, and through the internal passageway into the forward end of the stunning rod chamber alongside the at least one resilient cushion to drive the stunning rod rearward.

27. A method of stunning an animal comprising:
providing a housing having a catch piston chamber, a stunning rod chamber and a front end forward of the stunning rod chamber;
providing a housing having a catch piston chamber, a stunning rod chamber and a front end forward of the stunning rod chamber;
providing a supply passageway in the housing to supply pressurized fluid from a source of pressurized fluid to a rearward end of the stunning rod chamber;
providing a stunning rod slideable within the stunning rod chamber capable of being driven forward along a longitudinal axis towards and out of the front end of the housing;
providing a stunning rod piston connected to the stunning rod and slideable within the stunning rod chamber;
providing a head contact at the housing front end having a rear portion extending through an opening in a front end of the stunning rod chamber, the head contact being movable between a deactivated position and a position contacting the animal, the head contact in the deactivated position blocking flow of pressurized fluid from the source to the rearward end of the stunning rod chamber, the head contact in the position contacting the animal permitting air to flow from the supply passageway to urge the catch piston from the first position to the second position;
an internal passageway in the housing to supply pressurized fluid from a source of pressurized fluid to the front of the stunning rod chamber;
a passageway between the head contact rear portion and the opening in the front end of the stunning rod chamber;
contacting the animal with the head contact to permit pressurized fluid to flow from the source through the supply passageway into the rearward end of the stunning rod chamber to drive the stunning rod forward; and
causing the pressurized fluid to flow through the internal passageway into the forward end of the stunning rod chamber to drive the stunning rod rearward, whereupon a portion of the pressurized fluid flows through the passageway between the head contact rear portion and the opening in the front end of the stunning rod chamber to move the head contact into the deactivated position blocking flow of pressurized fluid from the source to the rearward end of the stunning rod chamber.

28. The method of claim 27 wherein the head contact includes a rear projection extending through the opening in a front end of the stunning rod chamber and the passageway between the head contact rear portion and the opening in the front end of the stunning rod chamber comprises a plurality of slots formed in a periphery of the head contact rear projection, and wherein the portion of the pressurized fluid flows through the slots in the head contact rear projection to move the head contact into the deactivated position blocking flow of pressurized fluid from the source to the rearward end of the stunning rod chamber.

29. The method of claim 27 further including:
providing at least one resilient cushion disposed at a front of the stunning rod chamber to cushion stopping of the stunning rod and stunning rod piston when the stunning rod piston reaches the front of the stunning rod chamber; and providing an internal passageway in the housing to supply pressurized fluid from a source of pressurized fluid to the front of the stunning rod chamber alongside the at least one resilient cushion, wherein, pressurized fluid may flow from the source alternately through the supply passageway into the rearward end of the stunning rod chamber to drive the stunning rod forward, and through the internal passageway into the forward end of the stunning rod chamber alongside the at least one resilient cushion to drive the stunning rod rearward.

30. A catch piston for use in opening and closing catches in a pneumatic animal stunner, the catches alternately holding and releasing a stunning rod to drive from a neutral position forward to stun the animal, comprising:
   a catch piston body adapted to be positioned adjacent the catches and slideable within a catch piston chamber, the catch piston having a length and being adapted to move between a first position urging the catches to hold the stunning rod, and a second position permitting the catches to release the stunning rod;
   a central passageway extending longitudinally through the length of the body;
   a first passageway in the catch piston body positioned to align with a housing supply passageway when the catch piston is in the first position permitting air to flow from a source of pressurized air through the first passageway and through the central passageway to a rearward end of the stunning rod;
   a second passageway in the catch piston body positioned to align with the supply passageway when the catch piston is in the second position permitting air to flow from the source of pressurized fluid through the second passageway to a forward portion of the stunning rod; and
   a third passageway in the catch piston body permitting air to flow from the rearward end of the stunning rod through the catch piston central passageway and to the atmosphere while the stunning rod is being returned to the neutral position.

31. The catch piston of claim 30 wherein the second passageway comprises a slot in an outer wall of the catch piston in alignment with the supply passageway when the catch piston is in the second position permitting pressurized fluid to flow from the source through the supply passageway and the slot to a forward end of the stunning rod chamber.

32. A nose for use in aligning and misaligning fluid flow passageways in a pneumatic animal stunner, the passageways for providing pressurized fluid to fire a stunning rod and for venting said pressurized fluid after firing said stunning rod, comprising:
   an outer housing nose having a nose rear wall and an activator chamber disposed therein;
   a head contact activator disposed within the outer housing nose and slideable between a forward position and a rearward position, the head contact activator having a cylindrical projection and a cylindrical body;
   a head activator chamber passageway extending from a position adjacent the head contact activator;
   a second passageway extending from a position adjacent the head contact activator;
   a head contact passageway comprising a slot extending around the periphery of the head contact cylindrical body; and
   a head contact vent for venting pressurized fluid buildup;
   wherein when the head contact activator is in the forward position, the head contact passageway aligns with the second passageway and the head contact vent to allow for venting of the pressurized fluid buildup through the head contact vent, and when the head contact activator is in the rearward position, the head contact passageway aligns with the head activator chamber passageway and second passageway to supply pressurized fluid to fire the stunning rod.

33. The nose of claim 32 wherein the head contact activator is moved from the forward position to the rearward position by pressing the head contact activator against an animal's head.

34. The system of claim 33 wherein pressurized fluid built up in the rearward end of the catch piston chamber vents through the head contact vent.

35. The system of claim 33 wherein pressurized fluid built up in the forward end of the catch piston chamber vents through the catch cylinder at least one vent passageway.

36. The system of claim 33 wherein a plurality of vent passageways are disposed in the catch cylinder.

37. The system of claim 36 wherein pressurized fluid built up in the forward end of the catch piston chamber vents through the plurality of vent passageways disposed in said catch cylinder.

38. The nose of claim 32 further including a main trigger, a main handle valve, and a handle vent, wherein depression of the main trigger opens the main handle valve to supply the pressurized fluid to the head activator chamber passageway via a first valve passage.

39. The nose of claim 38 wherein when the main trigger is undepressed, the head contact passageway does not align with the head activator chamber passageway, and a second valve passage aligns with the handle vent to vent any pressurized fluid in the head contact passageway to atmosphere.

40. A system for venting pressurized fluid from a pneumatic animal stunner, comprising:
   a housing having a catch piston chamber, a stunning rod chamber, a tail end, and a front end forward of the stunning rod chamber;
   a supply passageway in the housing between a source of pressurized fluid and the catch piston chamber;
   a stunning rod slideable within the stunning rod chamber capable of being driven forward along a longitudinal axis towards and out of the front end of the housing;
   a catch cylinder mounted on the tail end of the housing, the catch cylinder having at least one vent passageway;
   a catch mounted within the housing for alternately holding and releasing the stunning rod;
   a catch piston disposed adjacent the catch and in sliding contact within the catch piston chamber;
   an outer housing nose having a nose rear wall and an activator chamber disposed therein;
   a head contact activator disposed within the outer housing nose and slideable between a forward position and a rearward position;
   a head activator chamber passageway extending from a position adjacent the head contact activator; and
   a head contact vent for venting pressurized fluid buildup disposed in the head contact activator;
   wherein pressurized fluid built up to drive the stunning rod forward is later vented through the at least one vent passageway of the catch cylinder and the head contact vent.

* * * * *

UNITED STATES PATENT AND TRADEMARK OFFICE
CERTIFICATE OF CORRECTION

| | | |
|---|---|---|
| PATENT NO. | : 11,278,031 B2 | |
| APPLICATION NO. | : 17/123748 | |
| DATED | : March 22, 2022 | |
| INVENTOR(S) | : Arthur Jones and Trent Jones | |

It is certified that error appears in the above-identified patent and that said Letters Patent is hereby corrected as shown below:

In the Claims

Column 22, please remove Lines 10, 11 and 12

Signed and Sealed this
Seventh Day of March, 2023

*Katherine Kelly Vidal*

Katherine Kelly Vidal
*Director of the United States Patent and Trademark Office*